United States Patent
Yamada et al.

(10) Patent No.: US 8,559,134 B2
(45) Date of Patent: Oct. 15, 2013

(54) RADIO FREQUENCY MAGNETIC FIELD ASSISTED RECORDING HEAD, HEAD ASSEMBLY, AMD RECORDING APPARATUS

(75) Inventors: Kenichiro Yamada, Tokyo (JP); Hitoshi Iwasaki, Tokyo (JP); Katsuhiko Koui, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 62 days.

(21) Appl. No.: 13/325,155

(22) Filed: Dec. 14, 2011

(65) Prior Publication Data

US 2012/0176702 A1    Jul. 12, 2012

(30) Foreign Application Priority Data

Jan. 7, 2011    (JP) ................. 2011-002050

(51) Int. Cl.
*G11B 5/127* (2006.01)
*G11B 5/187* (2006.01)

(52) U.S. Cl.
USPC ........................ 360/125.3; 360/128

(58) Field of Classification Search
USPC ................. 360/125.3, 125.71, 128
See application file for complete search history.

(56) References Cited

U.S. PATENT DOCUMENTS

| 7,616,412 | B2 | 11/2009 | Zhu et al. |
| 7,808,330 | B2 * | 10/2010 | Fukuzawa et al. ............. 331/96 |
| 8,264,799 | B2 * | 9/2012 | Akiyama et al. ............ 360/324.1 |
| 2005/0023938 | A1 * | 2/2005 | Sato et al. ..................... 310/363 |
| 2008/0268291 | A1 | 10/2008 | Akiyama et al. |
| 2009/0225465 | A1 * | 9/2009 | Iwasaki et al. .................. 360/75 |
| 2011/0242701 | A1 | 10/2011 | Ohtake et al. |
| 2012/0176702 | A1 * | 7/2012 | Yamada et al. ............... 360/244 |
| 2012/0206837 | A1 * | 8/2012 | Fuji et al. ...................... 360/254 |
| 2012/0243127 | A1 * | 9/2012 | Iwasaki et al. ............... 360/290 |
| 2013/0050869 | A1 * | 2/2013 | Nagasaka et al. ............... 360/75 |

FOREIGN PATENT DOCUMENTS

JP    2008-277586    11/2008

* cited by examiner

*Primary Examiner* — Brian Miller
(74) *Attorney, Agent, or Firm* — Oblon, Spivak, McClelland, Maier & Neustadt, L.L.P.

(57) ABSTRACT

A recording head including a first electrode, a first magnetic layer, a second magnetic layer, a first intermediate layer, a third magnetic layer, a second electrode, and a magnetic pole. A product of saturated magnetization of the first magnetic layer and a lateral area of the first magnetic layer is larger than a product of saturated magnetization of the third magnetic layer and a lateral area of the third magnetic layer.

16 Claims, 15 Drawing Sheets

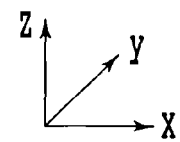
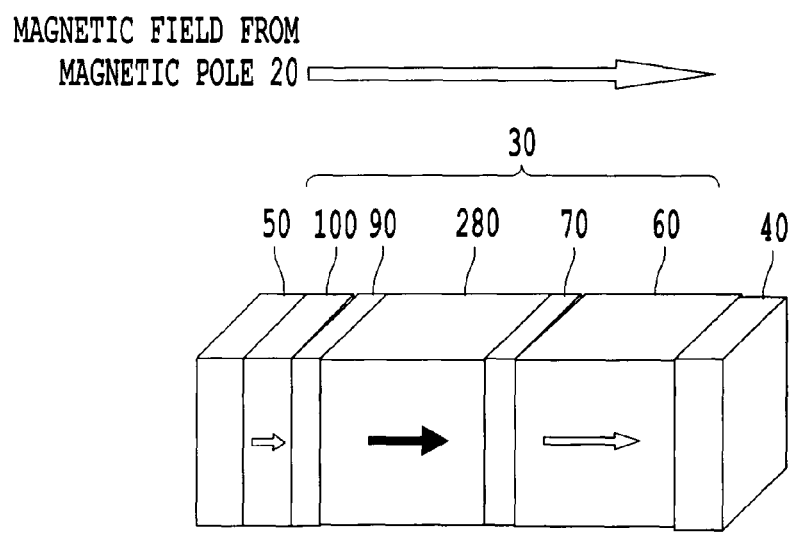
*Fig.3A*
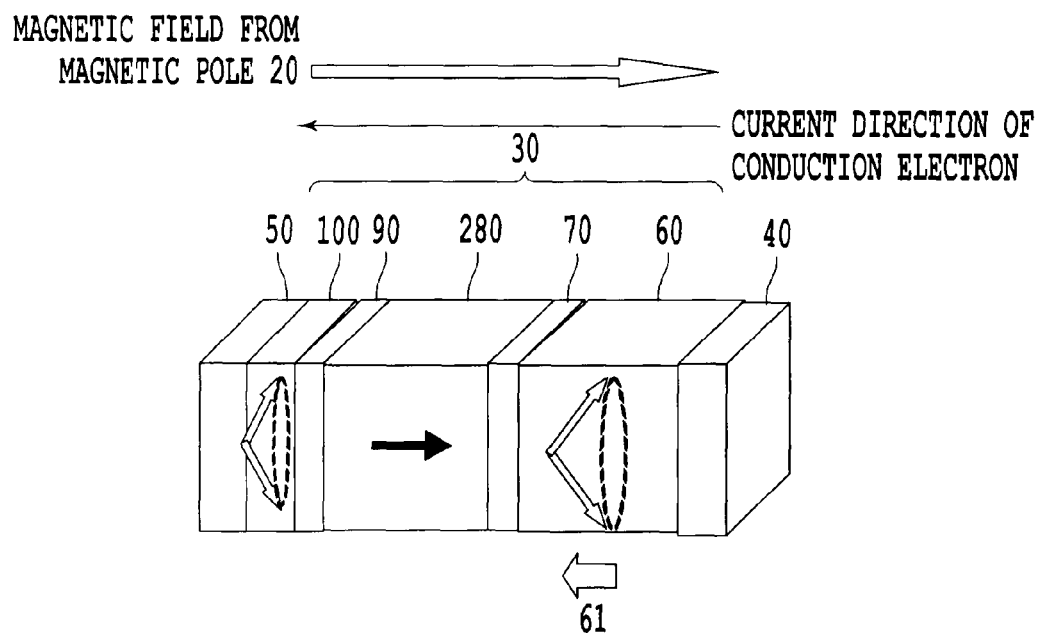
*Fig.3B*

*COMPARATIVE ART*

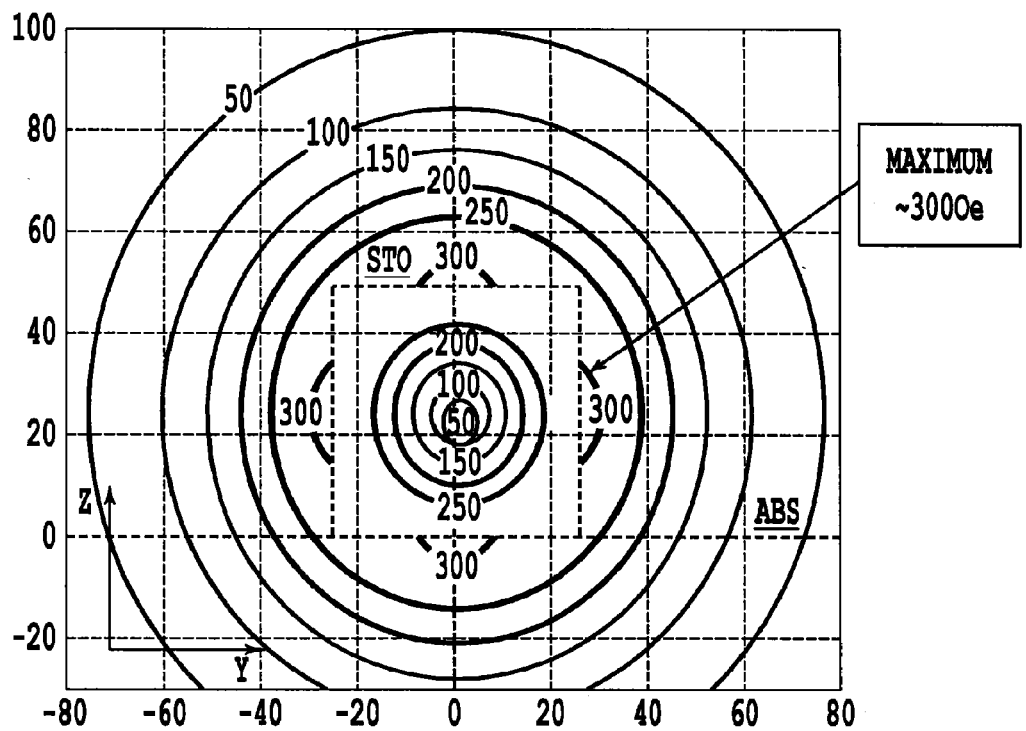
*Fig. 9A* COMPARATIVE ART
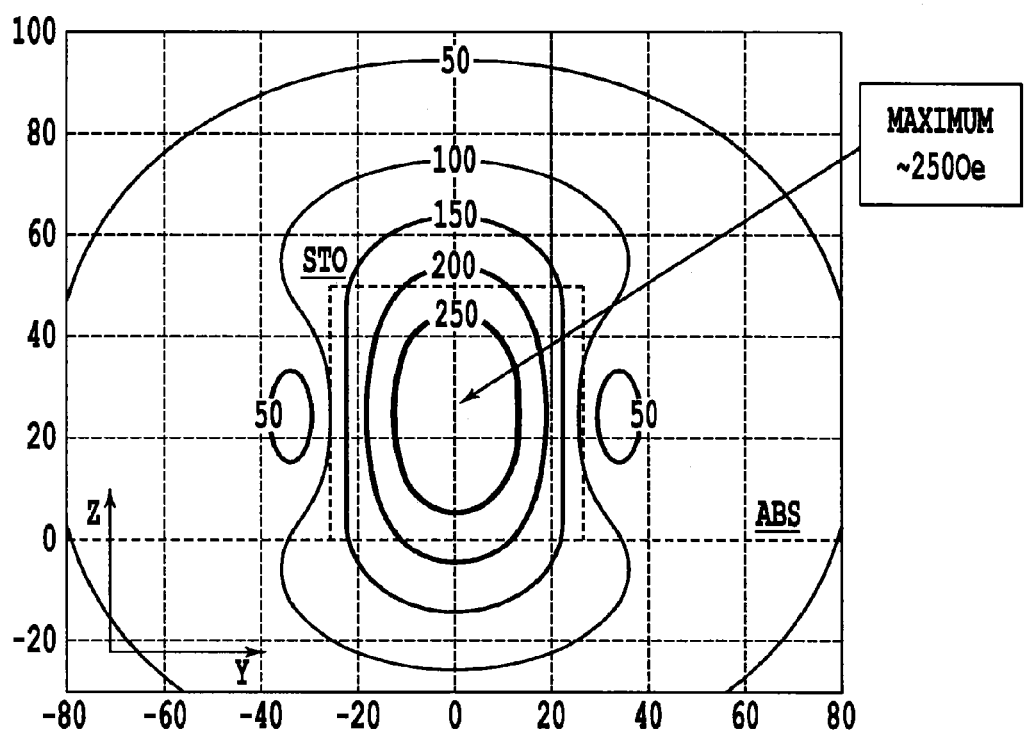
*Fig. 9B* COMPARATIVE ART

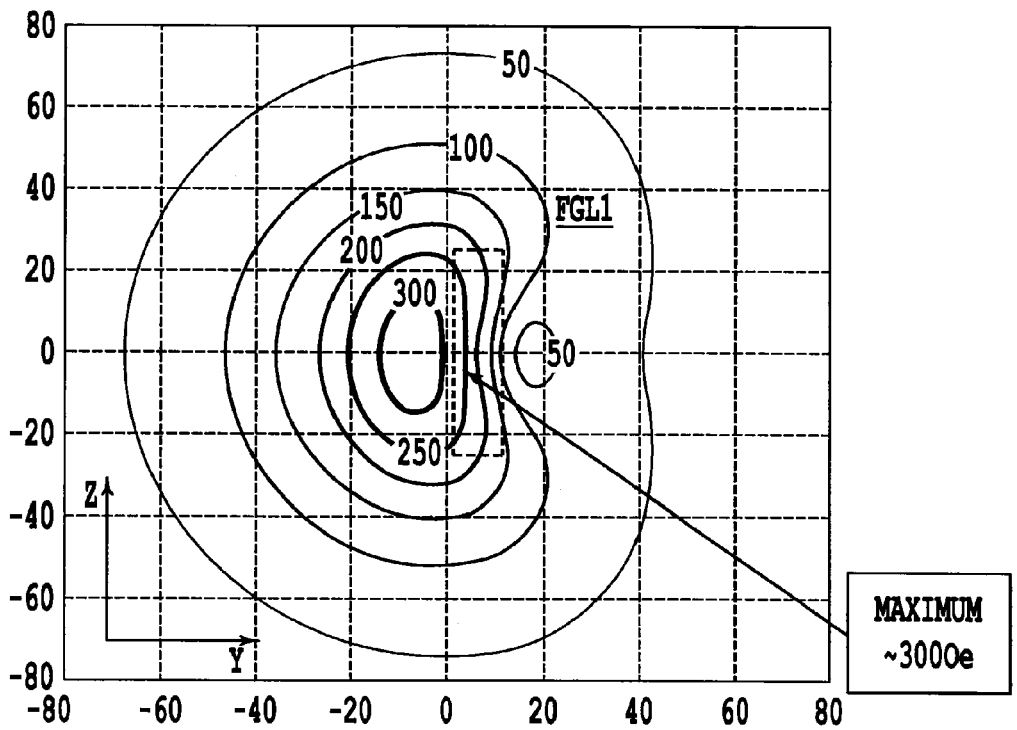
Fig. 9C COMPARATIVE ART
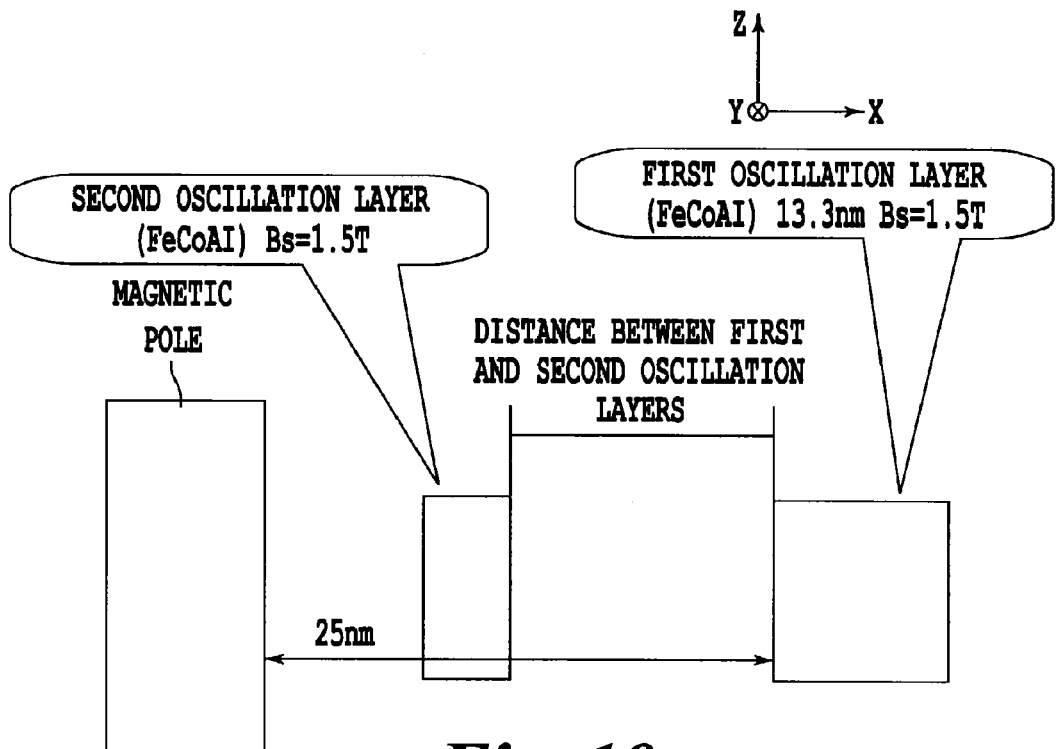
Fig. 10

US 8,559,134 B2

RADIO FREQUENCY MAGNETIC FIELD ASSISTED RECORDING HEAD, HEAD ASSEMBLY, AMD RECORDING APPARATUS

CROSS REFERENCE TO RELATED APPLICATION

This application is based upon and claims the benefit of priority from the prior Japanese Patent Application No. 2011-2050, filed on Jan. 7, 2011, the entire contents of which are incorporated herein by reference.

FIELD

Embodiments described herein are related to a recording head, magnetic head assembly, and magnetic recording apparatus.

BACKGROUND

Assisted recording, using a radio frequency magnetic field assisted recording head, referred to herein as a recording head, can record on a magnetic recording medium that has high magnetic anisotropy by superposing a radio frequency magnetic field and a recording magnetic field.

A spin torque oscillator (STO) including an oscillation layer and a spin injection layer can generate a radio frequency magnetic field by applying current to the STO. This is because magnetization of the oscillation layer can oscillate itself. A magnetic pole can then generate a recording magnetic field.

A radio frequency magnetic field and a recording magnetic field can be efficiently superposed on the magnetic recording medium if the distance between the STO and the magnetic pole is short.

However, the radio frequency magnetic field, which is generated from the oscillation layer in the STO, can also be applied to the magnetic pole when the distance between the STO and the magnetic pole is short. This phenomenon can induce energy loss because magnetization of the magnetic pole is not stable. This energy loss can reduce a generation rate for the radio frequency magnetic field of the oscillation layer.

BRIEF DESCRIPTION OF THE DRAWINGS

Aspects of this disclosure will become apparent upon reading the following detailed description and upon reference to the accompanying drawings. The description and the associated drawings are provided to illustrate embodiments of the invention and are not limited to the scope of the invention.

FIGS. 3(A), 3(B) are views explaining the first embodiment.

FIGS. 9(A), 9(B), 9(C) are views explaining the first comparison example.

FIG. 10 is a view explaining a second working example.

DETAILED DESCRIPTION

Figure 1:
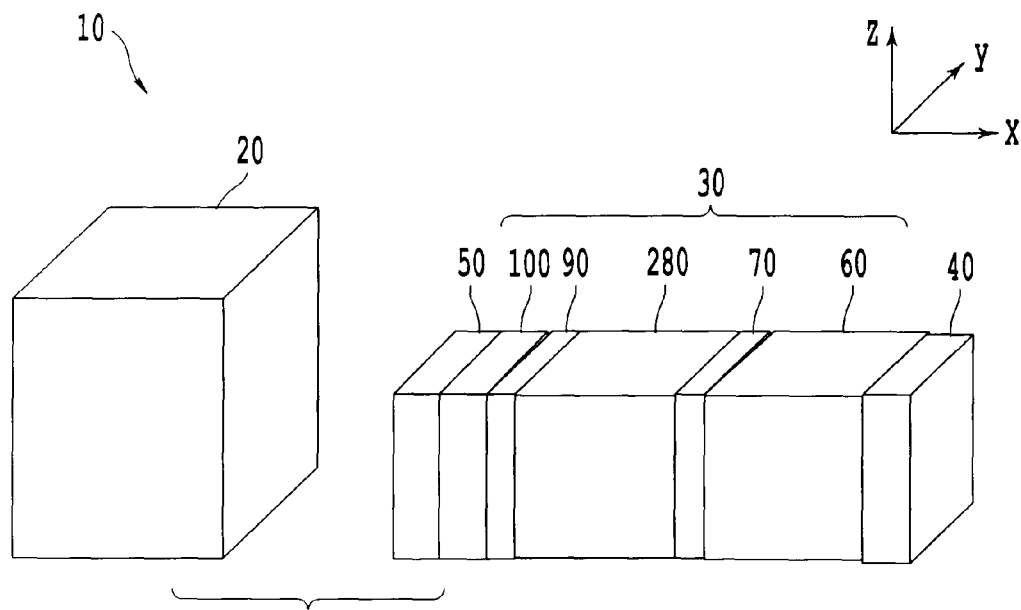
FIG. 1 is a view showing a recording head according to a first embodiment.

Embodiments will be described below with reference to the drawings. Wherever possible, the same reference numerals or marks will be used to denote the same or like portions throughout the figures, and overlapped explanations are omitted in embodiments following a first embodiment.

FIG. 1 shows a schematic illustration of a radio frequency magnetic field assisted recording head, referred to herein as a magnetic head, of a first embodiment.

The recording head 10 includes a magnetic pole 20, a STO 30 located near the magnetic pole 20, and a pair of electrodes 40, 50 that pass current in a laminating direction of the STO 30.

An x-axis, a y-axis, and a z-axis are perpendicular to each other. The x-axis refers to the laminating direction. The y-axis and the z-axis refer to directions perpendicular to the laminating direction.

The STO 30 includes a first oscillation layer 60 (a first magnetic layer), a second intermediate layer 70, a spin injection layer 280 (a second magnetic layer), a first intermediate layer 90, and a second oscillation layer 100 (a third magnetic layer).

A product of saturated magnetization of the first oscillation layer 60 and a lateral area of the first oscillation layer 60 is larger than that of a saturated magnetization of the second oscillation layer 100 and a lateral area of the second oscillation layer 100. The saturated magnetization refers to an amount of maximum magnetic charge of a magnetic body. The lateral area refers to an area, a side area, surrounding the STO 30 in a perpendicular direction to the laminating direction of the STO 30.

Figure 2:
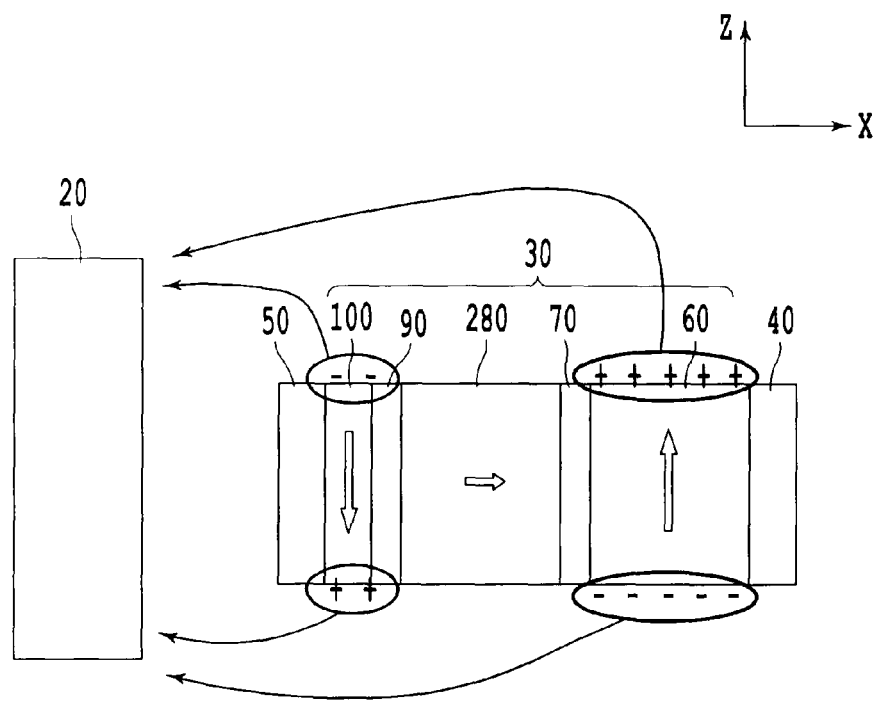
FIG. 2 is a view explaining the first embodiment.

FIG. 2 is an illustration explaining relations between the saturated magnetization and the lateral area of the first oscillation layer 60 and the second oscillation layer 100. In FIG. 2 the STO 30 is illustrated viewed from the y-axis direction for a clear understanding.

In a z-axis, the magnetization direction of the first oscillation layer 60 and the magnetization direction of the second oscillation layer 100 are unparallel to each other. This is because the magnetization of the first oscillation layer 60 and the magnetization of the second oscillation layer 100 interact with each other. The magnetization direction of the spin injection layer 280 is parallel to the laminating direction of the STO 30.

Each of the side areas of the first oscillation layer 60 and of the second oscillation layer 100 has a magnetic charge that is positive or negative. The positive is indicated by '+', and the negative is indicated by '−'. The second oscillation layer 100 has a magnetic charge that is different from that of the first oscillation layer 60 in the side area of the same side of the first oscillation layer 60.

The total radio frequency magnetic field the STO 30 generates toward the magnetic pole 20 is the sum of the radio frequency magnetic field that magnetic charge of the first oscillation layer 60 generates toward the magnetic pole 20 and the radio frequency magnetic field that magnetic charge of the second oscillation layer 100 generates toward the magnetic pole 20. This radio frequency magnetic field the STO 30 generates toward the magnetic pole 20 influences magnetization of the magnetic pole 20.

The distance of the magnetic pole 20 from the second oscillation layer 100 is shorter than the distance of the magnetic pole 20 from the first oscillation layer 60. A result is the radio frequency magnetic field the second oscillation layer 100 generates toward the magnetic pole 20 is larger than that of the first oscillation layer 60, per unit of magnetic charge. Thus, the second oscillation layer 100 can more effectively generate the radio frequency magnetic field toward the magnetic pole 20 than the first oscillation layer 60. On the other hand, the total magnetic charge of the second oscillation layer 100 is smaller than that of the first oscillation layer 60. Thus, the radio frequency magnetic field (from the total magnetic charge) the first oscillation layer 60 generates toward the magnetic pole 20 and the radio frequency magnetic field (from the total magnetic charge) the second oscillation layer 100 generates toward the magnetic pole 20 have different signs from each other and are almost the same amount, and thereby the radio frequency magnetic field that the first oscillation layer 60 and the second oscillation layer 100 generate toward the magnetic pole 20 cancel out each other. Due to this phenomenon, the radio frequency magnetic field the STO 30 generates toward the magnetic pole 20 decreases largely in comparison with a case in which the STO 30 has only a single oscillation layer. This enables the STO 30 to oscillate a stable radio frequency magnetic field because fluctuation of the magnetization of the magnetic pole 20 decreases.

The magnetic field the STO 30 generates toward a magnetic recording medium is the sum of the magnetic field the first oscillation layer 60 generates toward the magnetic recording medium and the magnetic field the second oscillation layer 100 generates toward the magnetic recording medium. The distance of the magnetic recording medium from the first oscillation layer 60 is almost the same as the distance of the magnetic recording medium from the second oscillation layer 100. Thus, the magnetic field per unit of magnetic charge the first oscillation layer 60 generates toward the magnetic recording medium is almost the same as the magnetic field per unit of magnetic charge the second oscillation layer 100 generates toward the magnetic recording medium.

The strength of the magnetic field that the first oscillation layer 60 and the second oscillation layer 100 generate are different from each other because the amount of magnetic charge of the first oscillation layer 60 interacting with the magnetic recording medium is different from the amount of magnetic charge of the second oscillation layer 100 interacting with the magnetic recording medium. This enables the STO 30 to generate a radio frequency magnetic field to the magnetic recoding media because the strength of the radio frequency magnetic field the first oscillation layer 60 and the second oscillation layer 100 generate is not cancelled out. In the case the lateral area of the first oscillation layer 60 is larger than that of the second oscillation layer 100, the material which is used for the first oscillation layer 60 and the second oscillation layer 100 is adjusted appropriately. In this case saturated magnetization of the first oscillation layer 60 is smaller than that of the second oscillation layer 100.

The STO 30 can also work without the second intermediate layer 70. This enables magnetization of the spin injection layer 280 and magnetization of the first oscillation layer 60 to be exchanged coupled with each other. This results in an effective magnetic field that corresponds to the sum of external magnetic field, diamagnetic field, and exchanged coupled magnetic field increasing in the x-axis of the first oscillation layer 60. Oscillating frequency is proportional to the x-axial component in the effective magnetic field of the first oscillation layer 60. Thus, the first oscillation layer 60 can oscillate with higher frequency without the second intermediate layer 70 even if the magnetic field from the magnetic pole 20 is the same. This enables the STO 30 to record on a media with a high resonant frequency that has high anisotropy energy, and this also realizes higher recording density.

A soft magnetic material or a material with perpendicular magnetic anisotropy can be used for the first oscillation layer 60.

FeCoAl, FeCo, FeCoNi, FeCoSi, NiFe, FeN, CoNiFe, or an alloy including one or more of Fe or Co can be used for the soft magnetic material. A Whistler alloy such as CoMnSi, CoMnSi, CoFeAlSi, CoMnAl, CoMnGaSn, CoMnGaGe, CoCrFeSi, or CoFeCrAl can be also used for the soft magnetic material. Nb, B, Ge, or Ni can also be added to the soft magnetic material for adjusting magnetostriction of the soft magnetic material. These materials have crystalline orientation in fcc (face centered cubic) <111> direction or bcc (body centered cubic) <110> direction. These orientations enable the first oscillation layer 60 to improve spin torque and oscillate stably and with keeping soft magnetic properties.

A Co or Fe related alloy including one or a plural set of elements selected from Ni, Pt Pd, and Sm can be used for the material with perpendicular magnetic anisotropy. An artificial lattice film such as Co/Ni, Co/Pt, Co/Pd, or CoPt-related material such as CoPt, CoCrPt, or RE-TM-related alloy such as TbFeCo, CoSm can also be used for the material with perpendicular magnetic anisotropy. These materials have uniaxial anisotropy which is the easy axis of magnetization in parallel to the laminating direction of the STO 30. These materials also have crystalline orientation in fcc, face centered cubic, <111> direction or hcp, hexagonal close packed, <0001> direction.

The artificial lattice film refers to a laminating monolayer, in a range from 0.1 nm to 5 nm in thickness, repeatedly ranging from two times to four times. For instance, Co/Ni refers to laminating Co layer ranging from 1 nm to 5 nm in thickness, Ni layer ranging from 1 nm to 5 nm in thickness, Co layer ranging from 0.1 nm to 5 nm in thickness, Co layer ranging from 0.1 nm to 5 nm in thickness in this order repeatedly. Ni layer can also be laminated firstly.

RE refers to rare earth. For example, RE refers to Gd, Dy, Ho, Er, or Tm. TM refers to transition metal. For example, TM refers to Fe, Co, or Ni. RE-TM related alloy are GdFe$_x$, DyFe$_y$, HoFe$_y$, ErFe$_y$, TmFe$_x$, GdCo$_y$. Here x is in a range from 2 to 3 and y is in a range from 2 to 4.

A layer including the soft magnetic material and a layer including the material with perpendicular magnetic anisotropy can be laminated in combination for the first oscillation layer 60. This enables to adjust perpendicular magnetic anisotropy of the first oscillation layer 60. As a result, driving current passing through the STO 30 can be reduced and the first oscillation layer 60 can generate a stable radio frequency magnetic field because perpendicular magnetic anisotropy, which is applied to the magnetic field from the magnetic pole 20, of the first oscillation layer 60 can be adjusted.

The first oscillation layer 60 is oscillated by applying a magnetic field from the magnetic pole 20 and passing a driving current. As a result, good radio frequency magnetic field assisted recording can be realized because a stable radio frequency magnetic field can be applied to the magnetic recording medium. Coercivity of the first oscillation layer 60 is smaller than that of the magnetic field from the magnetic pole 20. This enables the STO 30 to oscillate a stable radio frequency magnetic field that does not depend on polarity on recording. As a result, a low recording bit error rate can be realized.

A material with perpendicular magnetic anisotropy can be used for the spin injection layer 280.

A Co or Fe related alloy including one or a plural set of elements selected from Ni, Pt Pd, and Sm can be used for the material with perpendicular magnetic anisotropy. An artificial lattice film such as Co/Ni, Co/Pt, Co/Pd, or CoPt-related material such as CoPt, CoCrPt, or RE-TM-related alloy such as TbFeCo, CoSm can also be used for the material with perpendicular magnetic anisotropy. These materials have uniaxial anisotropy which is the easy axis of magnetization in parallel to the laminating direction of the STO 30. These materials also have crystalline orientation in fcc, face centered cubic, <111> direction or hcp, hexagonal close packed, <0001> direction.

Magnetization of the spin injection layer 280 is not affected by spin torque generated from the first oscillation layer 60 during passing current through the STO 30. This enables to stably fix magnetization of the spin injection layer 280 in a parallel direction to the laminating direction of the STO 30. Energy loss for driving current passing through the spin injection layer 280 can be reduced because magnetization of the spin injection layer 280 is stable. As a result, the STO 30 can generate a stable radio frequency magnetic field with a small driving current.

Coercivity of the spin injection layer 280 is smaller than the magnetic field applied from the magnetic pole 20. This enables the magnetization direction of the spin injection layer 280 to be parallel to the magnetic field applied from the magnetic pole 20 without being affected by the magnetic field direction from the magnetic pole 20. Moreover, this enables the STO 30 to generate a stable radio frequency magnetic field that does not depend on polarity on recording. Coercivity of the spin injection layer 280 is larger than that of the first oscillation layer 60 and the second oscillation layer 100.

A layer including the material with perpendicular magnetic anisotropy and a layer including the soft magnetic material used for the first oscillation layer 60 can be laminated in combination for the spin injection layer 280. This enables saturated magnetization, anisotropy field, and spin torque efficiency of the spin injection layer 280 to be adjusted. In the case the layer including the soft magnetic material is provided near the second intermediate layer 70, driving current passing through the STO 30 can be reduced because spin torque efficiency of the STO 30 increases. A lag for flipping magnetization of the spin injection layer 280 can be improved on flipping the magnetic field of the magnetic pole 20. As a result, a recording bit error rate can be reduced.

The soft magnetic material used for the first oscillation layer 60 can be used for the second oscillation layer 100.

FeCoAl, FeCo, FeCoNi, FeCoSi, NiFe, FeN, CoNiFe, or an alloy including one or more of Fe or Co can be used for the soft magnetic material. These materials have crystalline orientation in fcc, face centered cubic, <111> direction or bcc, body centered cubic, <110> direction. These orientations enable the second oscillation layer 100 to improve spin torque and oscillate stably with keeping soft magnetic properties.

By use of the soft magnetic material for the second oscillation layer 100, magnetization of the second oscillation layer 100 is magnetized easily by the radio frequency magnetic field generated from the first oscillation layer 60. Both the first oscillation layer 60 and the second oscillation layer 100 generate a radio frequency magnetic field with a magnetization direction of the first oscillation layer 60 and magnetization direction of the second oscillation layer 100 unparallel. As a result, the radio frequency magnetic field from magnetization of the first oscillation layer 60 affecting the magnetic pole 20 and the radio frequency magnetic field from magnetization of the second oscillation layer 100 affecting the magnetic pole 20 cancel out each other. Thus, strength of the radio frequency magnetic field in the magnetic pole 20 decreases greatly in comparison with not using the second oscillation layer 100. Energy loss for the magnetic pole 20 can be reduced because the magnetic pole 20 is not affected so much by the radio frequency magnetic field that the STO 30 generates. As a result, this enables to oscillate a stable radio frequency magnetic field with a small driving current.

Coercivity of the second oscillation layer 100 is smaller than the magnetic field applied from the magnetic pole 20. This enables to oscillate a stable radio frequency magnetic field that does not depend on polarity on recording.

There are two kinds of spin torque. One is positive spin torque, and the other is negative spin torque. The positive spin torque can be generated when a majority spin electron of magnetic material is used as a conduction election. The majority spin electron refers to a spin electron of angular momentum that turns to the magnetization direction of magnetic material. In this case, the direction of the positive spin torque turns to the magnetization direction of the magnetic material when a conduction electron passes through the magnetic material. On the other hand, the direction of the positive spin torque turns to the opposite magnetization direction of the magnetic material when a conduction electron reflects in the magnetic material. The negative spin torque can be generated when a minority spin electron of the magnetic material is used as a conduction electron. The minority spin electron refers to a spin electron of angular momentum that turns to the opposite magnetization direction of the magnetic material. In this case, the direction of the negative spin torque turns to the opposite magnetization direction of the magnetic material when a conduction electron passes through the magnetic material. On the other hand, the direction of the negative spin torque turns to the magnetization direction of the magnetic material when a conduction electron reflects in the magnetic material. In this specification, spin torque refers to the positive spin torque if not otherwise specified.

The minority spin electron can be used as a conduction electron by using Cr, Ru, or the like for the intermediate layer.

FIGS. 3(A), 3(B) are illustrations explaining operation for the STO 30.

FIG. 3(A) illustrates a state without a driving current. FIG. 3(B) illustrates a state with a driving current. The operation is explained with a conduction electron. A current direction of the conduction electron is opposite to that of the driving current.

As shown in FIG. 3(A) the magnetization of the first oscillation layer 60, the spin injection layer 280, and the second oscillation layer 100 is parallel to the magnetic field direction from the magnetic pole 20. This is because coercivity of the first oscillation layer 60, the spin injection layer 280, and the second oscillation layer 100 is smaller than the magnetic field from the magnetic pole 20.

As shown in FIG. 3(B) the first oscillation layer 60 receives a spin torque 61 of a conduction electron that reflects in the spin injection layer 280 when a material such as Cu or the like having a long spin diffusion length is used for the second intermediate layer 70 and the conduction electron is passed through the STO 30. In this case the spin torque 61 turns to the opposite magnetization direction of the spin injection layer 280. This is because the positive spin torque is generated from the spin injection layer 280 for the first oscillation layer 60. The first oscillation layer 60 oscillates because the magnetic filed direction from the magnetic pole 20 is opposite to the direction of the spin torque 61.

The second oscillation layer 100 does not receive spin torque information for magnetization of the spin injection layer 280 when a material such as Ta or the like having a short spin diffusion length is used for the first intermediate layer 90 and a film thickness of the first intermediate layer 90 is thinned, because the information is lost in the first intermediate layer 90. Thus magnetization of the second oscillation layer 100 oscillates by receiving a radio frequency magnetic field generated from the first oscillation layer 60. In this case, both magnetization of the second oscillation layer 100 and magnetization of the first oscillation layer 60 oscillate with the magnetization being substantially unparallel.

Figure 4A:
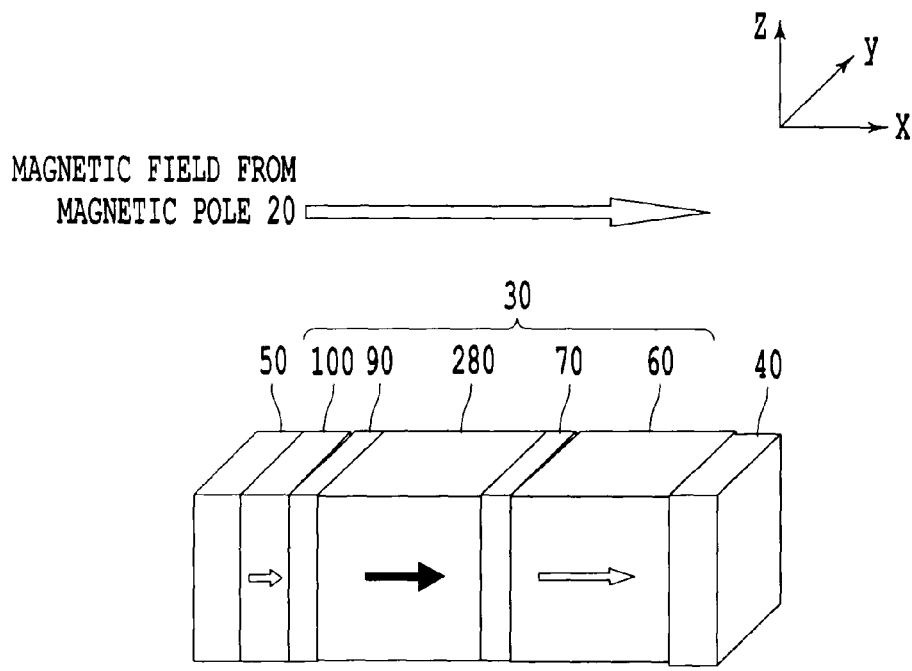
FIGS. 4(A), 4(B) are views explaining the first embodiment.
Figure 4B:
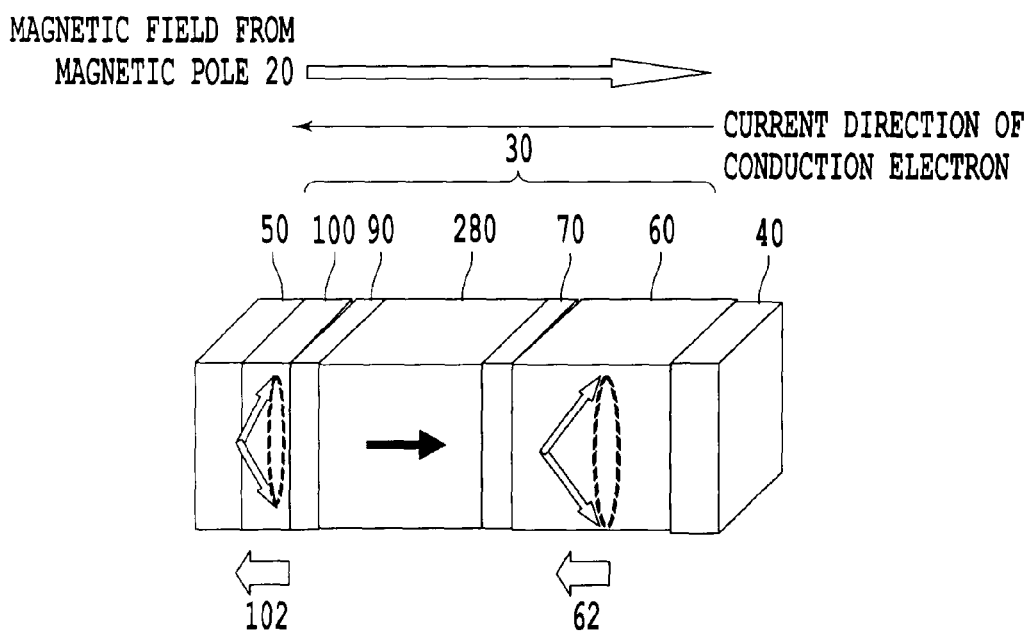

FIGS. 4(A), 4(B) are illustrations explaining an operation for the STO 30 in a case that the minority spin electron is used as a conduction electron for the first intermediate layer 90. In this case, the negative spin torque is generated between the second oscillation layer 100 and the spin injection layer 280.

As shown in FIG. 4(A) the magnetization of the first oscillation layer 60, the spin injection layer 280, and the second oscillation layer 100 are parallel to the magnetic field direction from the magnetic pole 20 when a conduction electron does not pass through the STO 30. This is because coercivity of the first oscillation layer 60, the spin injection layer 280, and the second oscillation layer 100 are smaller than the magnetic field from the magnetic pole 20.

As shown in FIG. 4(B) the first oscillation layer 60 receives a spin torque 62 that reflects in the spin injection layer 280 when a material such as Cu or the like having a long spin diffusion length is used for the second intermediate layer 70 and a conduction electron passes through the STO 30. In this case, the spin torque 62 turns to opposite to the magnetization direction of the spin injection layer 280. This is because the positive spin torque is generated from the spin injection layer 280 for the first oscillation layer 60. The first oscillation layer 60 oscillates because the magnetic field direction from the magnetic pole 20 is opposite to the direction of the spin torque 62.

The second oscillation layer 100 receives a spin torque 102 that has passed through information for magnetization of the spin injection layer 280 when a material such as Cr, Ru, or the like, in which their minority spin electron works as a conduction electron, is used for the first intermediate layer 90. In this case the spin torque 102 turns to the opposite magnetization direction of the spin injection layer 280. This is because the negative spin torque is generated from the spin injection layer 280 for the second oscillation layer 100 when a conduction electron passes through the spin injection layer 280. Thus the second oscillation layer 100 oscillates because the magnetic field direction from the magnetic pole 20 is opposite to the direction of the spin torque 102. In this case both the magnetization of the second oscillation layer 100 and the first oscillation layer 60 oscillate with the magnetization being substantially unparallel because the second oscillation layer 100 and the first oscillation layer 60 receive a radio frequency magnetic field generated from the first oscillation layer 60.

The second oscillation layer 100 can efficiently generate a radio frequency magnetic field by using a minority spin electron which is used as a conduction electron for the first intermediate layer 90. This radio frequency magnetic field can be generated by two effects; one is the radio frequency magnetic field generated from the first oscillation layer 60, and the other is the spin torque 102 generated from the spin injection layer 280. This enables to oscillate a stable radio frequency magnetic field because a driving current that passes through the STO 30 can be reduced.

A material having a short spin diffusion length can be used for the first intermediate layer 90.

Ru, Pt, Pd, Ta, or the like can be used for the short spin diffusion length. These materials can be combined for using in the first intermediate layer 90. Using a material having a short spin diffusion length for the first intermediate layer 90 enables to reduce the influence of the positive spin torque generated from the spin injection layer 280 even though a film thickness of the first intermediate layer 90 is thin. Thus a size of the STO 30 can be made smaller because the film thickness of the first intermediate layer 90 can be made smaller. This enables to control a shape of the STO 30 and a time for processing the STO 30.

In a case that the second oscillation layer 100 oscillates by use of the negative spin torque, a material such as used for the first oscillation layer 60 is used for the second oscillation layer 100 whose majority spin electron is a conduction electron, and a material such as Cr or Ru that can efficiently propagate the negative spin torque is used for the first intermediate layer 90. A film thickness of Ru is made thinner when Ru is used for the first intermediate layer 90, because a spin diffusion length of Ru is short. This enables the STO 30 to oscillate a stable radio frequency magnetic field because a driving current that passes through the STO 30 can be reduced.

FeCoAl, FeCo, FeCoNi, FeCoSi, NiFe, FeN, CoNiFe, or an alloy including one or more of Fe or Co can be used for a material whose majority spin electron of a magnetic material is a conduction electron. These materials have crystalline orientation in fcc, face centered cubic, <111> direction or bcc, body centered cubic, <110> direction. These orientations enable the STO 30 to improve spin torque and oscillate stably with keeping soft magnetic properties.

In a case that the second oscillation layer 100 oscillates by the negative spin torque, a material such as $Fe_4N$ whose minority spin electron is a conduction electron is used for the second oscillation layer 100, and a material such as Cu, Ag, or Au that can efficiently propagate the positive spin torque is used for the first intermediate layer 90. This enables the STO 30 to oscillate a stable radio frequency magnetic field because a driving current that passes through the STO 30 can be reduced.

An alloy including $Fe_4N$ or the like can be used for a material whose minority spin electron of a magnetic material is a conduction electron. These materials have crystalline orientation in fcc, face centered cubic, <111> direction or bcc, body centered cubic, <110> direction. These orientations enable the STO 30 to improve spin torque and oscillate stably with keeping soft magnetic properties.

A material having a long spin diffusion length is used for the second intermediate layer 70. Adjusting a film thickness of the second intermediate layer 70 enables to adjust exchanged coupling between the first oscillation layer 60 and the spin injection layer 280 without decreasing spin torque efficiency.

Cu, Ag, Au, or the like can be used for the material of the long spin diffusion length. These materials can be combined and used as an alloy. Using these materials for the second intermediate layer 70 enables to efficiently propagate spin torque generated from the first oscillation layer 60 and the spin injection layer 280.

Figure 5:
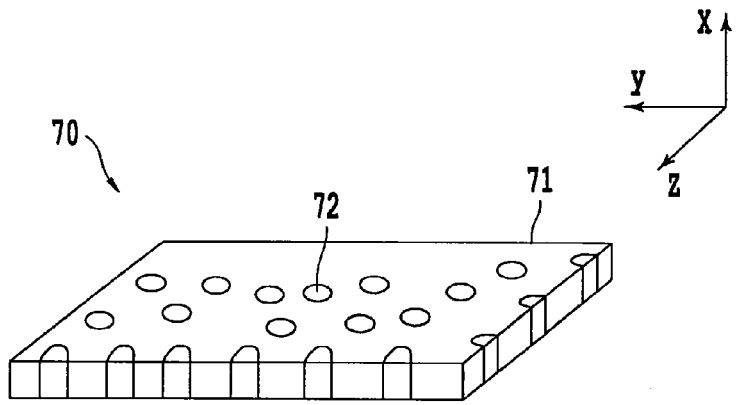
FIG. 5 is a view explaining the first embodiment.

As shown in FIG. 5 a current confined path structure, which is based on an insulator 71 such as alumina ($Al_2O_3$) and a current path 72 using a material with a long spin diffusion length, can also be used for the second intermediate layer 70. Using the current confined path structure for the second intermediate layer 90 enables to efficiently oscillate the first oscillation layer 60 with keeping a spin torque rate high. As a result, this enables to generate a stable radio frequency magnetic field because a driving current that passes through the STO 30 can be reduced. Thus, this realizes a stable radio frequency magnetic field assisted recording with a small driving current. A nonmagnetic material such as Cu, Ag, Au or the like, or a magnetic material including an alloy including one or more of Ni, Fe, or Co, can be used for the current path 72.

A first working example of the above-described embodiment is now explained. A radio frequency magnetic field, which was generated from a surface facing a STO of a magnetic pole (magnetic pole surface) and a surface facing a magnetic recording head of a magnetic recording medium (ABS), was calculated with use of macro spin model.

Figure 6:
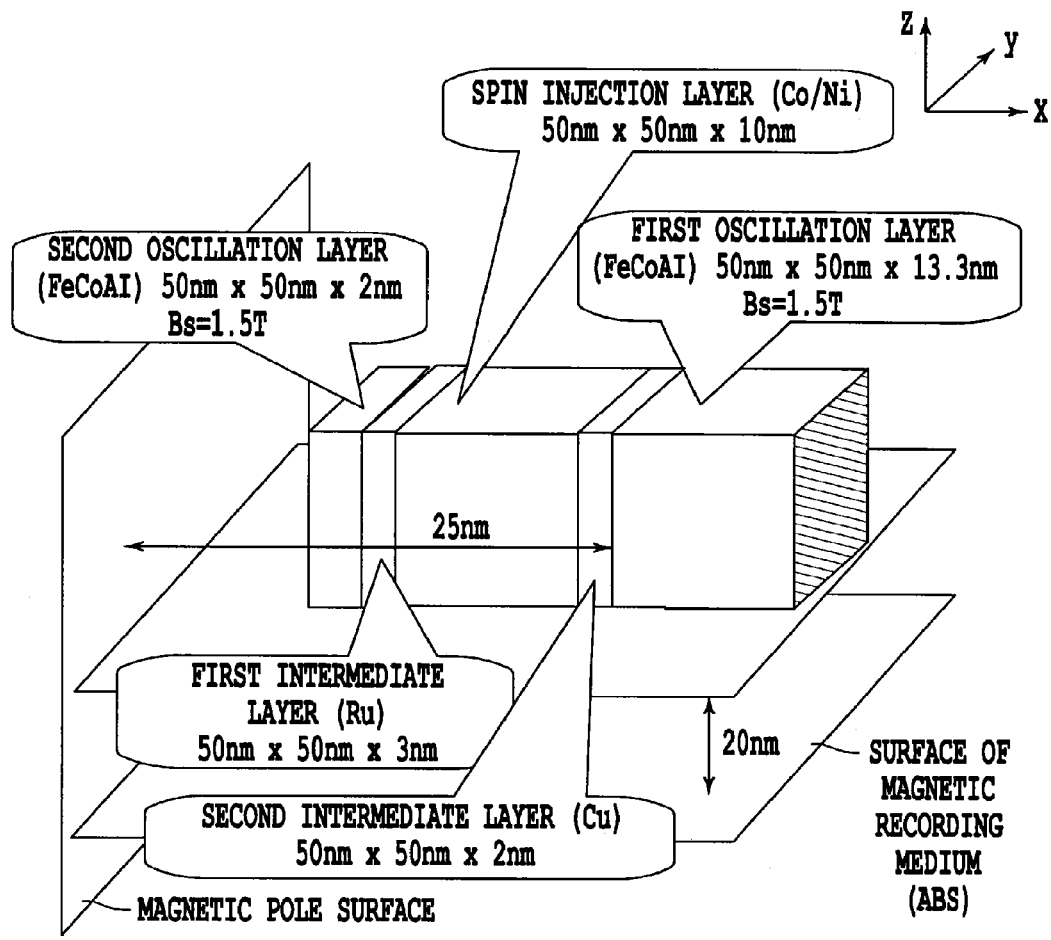
FIG. 6 is a view explaining a first working example.

FIG. 6 illustrates a structure used for calculating a radio frequency magnetic field from the STO. FeCoAl was used for a first oscillation layer, and a volume of the first oscillation layer was set to 50 nm by 50 nm by 13.3 nm, and saturation flux density (Bs) was set to 1.5 T. Cu was used for a second intermediate layer, and a volume of the second intermediate layer was set to 50 nm by 50 nm by 3 nm. A Co/Ni artificial lattice film was used for a spin injection layer, and a volume of the spin injection layer was set to 50 nm by 50 nm by 10 nm. Ru was used for a first intermediate layer, and a volume of the first intermediate layer was set to 50 nm by 50 nm by 3 nm. FeCoAl was used for a second oscillation layer, and a volume of the second oscillation layer was set to 50 nm by 50 nm by 2 nm, and saturation flux density (Bs) was set to 1.5 T. A distance between an ABS and the STO was set to 20 nm. A distance between the first oscillation layer and the magnetic pole was set to 25 nm.

Figure 7A:
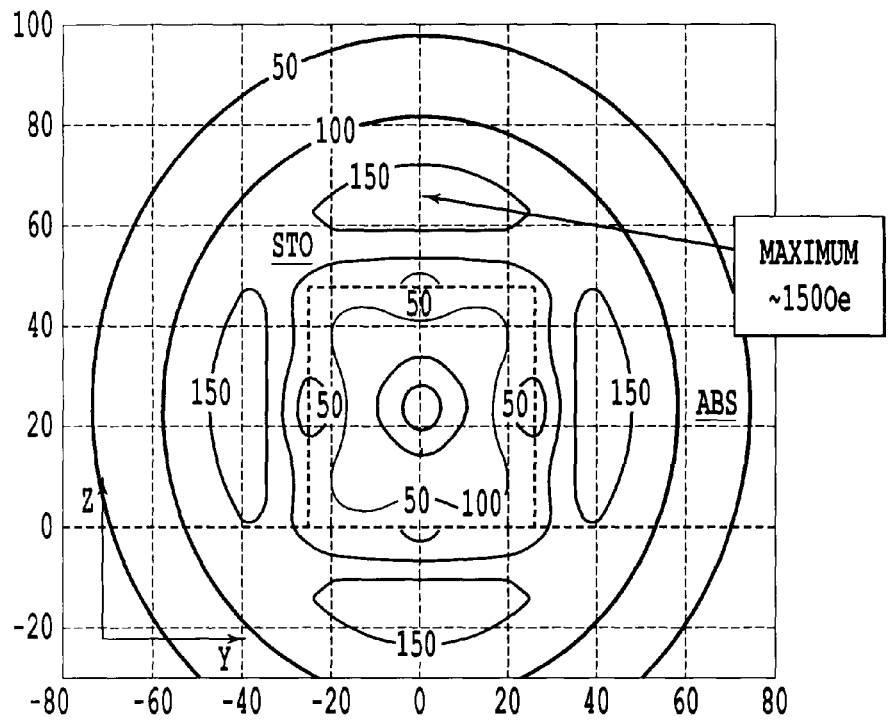
FIGS. 7(A), 7(B), 7(C) are views explaining the first working example.
Figure 7B:
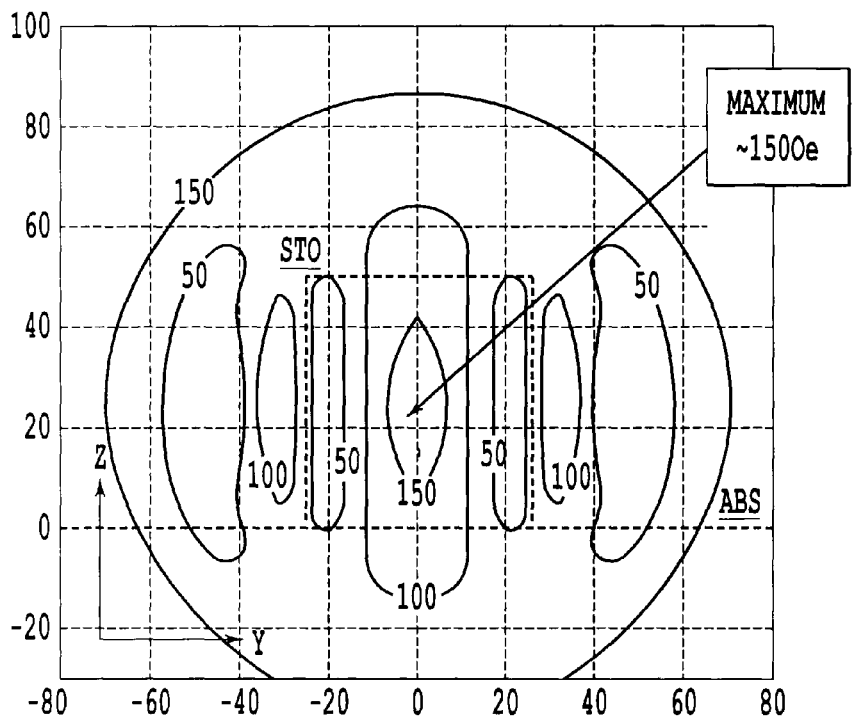
Figure 7C:
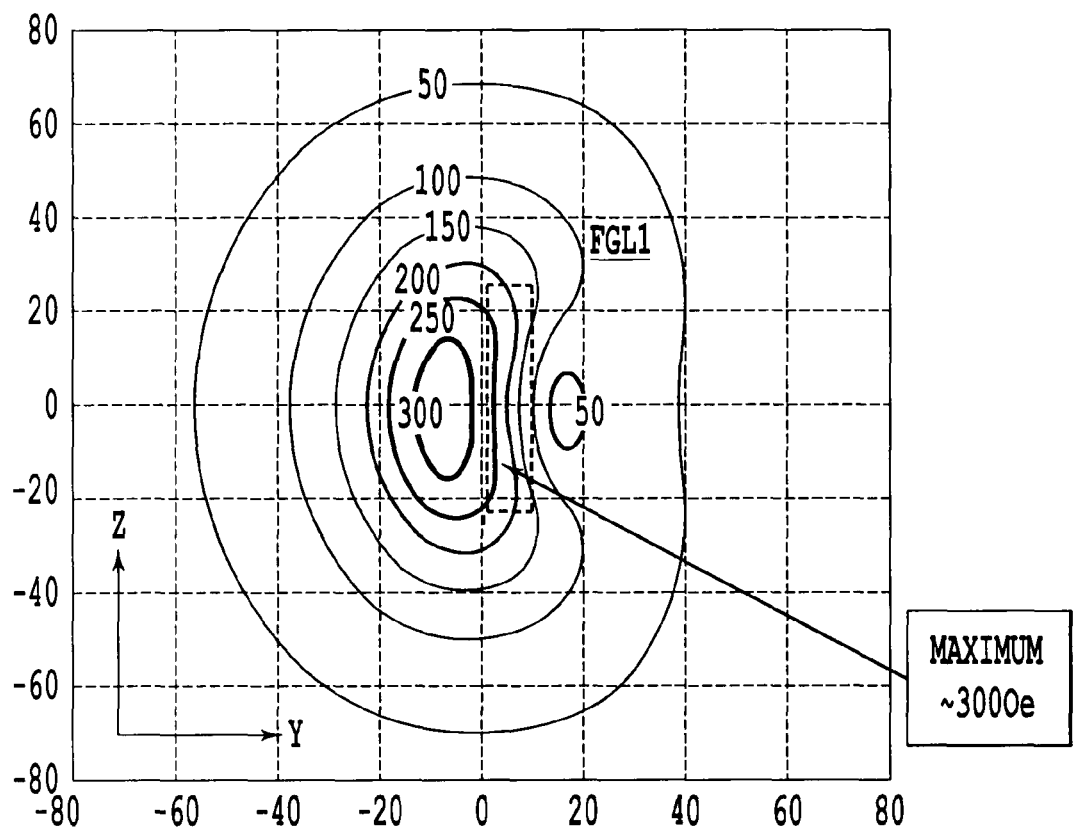

FIGS. 7(A), 7(B), 7(C) show strength of a radio frequency magnetic field that was generated from the STO on the magnetic pole surface and on the ABS. A value for the radio frequency magnetic field is shown on the line.

In FIG. 7(A), a vertical axis refers to a distance (nm) on a z-axis, and a horizontal axis refers to a distance (nm) on a y-axis. The vertical axis corresponds to a distance from the ABS. An area surrounded with a dotted line corresponds to a shape in viewing the STO from a laminating direction of the STO. A dotted line drawn in parallel to the horizontal axis refers to the ABS. Strength of the radio frequency magnetic field for an x-axis (down track direction: track direction of a magnetic recording medium) component was detected. As shown in FIG. 7(A) strength of the radio frequency magnetic field was spread uniformly. Strength of the radio frequency magnetic field was 150 Oe at maximum.

In FIG. 7(B), a vertical axis refers to a distance (nm) on a z-axis, and a horizontal axis refers to a distance (nm) on a y-axis. The vertical axis corresponds to a distance from the ABS. An area which is surrounded with a dotted line corresponds to a shape in viewing the STO from a laminating direction of the STO. A dotted line drawn in parallel to the horizontal axis refers to the ABS. Strength of the radio frequency magnetic field for a y-axis (cross track direction: direction which is across a track of the magnetic recording medium) component was detected. As shown in FIG. 7(B) strength of the radio frequency magnetic field was spread in the z-axis direction. This is because the radio frequency magnetic field only for the y-axis was detected. Strength of the radio frequency magnetic field was 150 Oe at maximum.

In FIG. 7(C), a vertical axis refers to a distance (nm) on the y-axis, and a horizontal axis refers to a distance (nm) on the x-axis. The x-axis and the y-axis correspond to a surface of the magnetic recording medium. An area which is surrounded with a dotted line corresponds to a shape in viewing a first oscillation layer (shown as FGL1 in FIG. 7(C)) from the magnetic recording medium. Strength of the radio frequency magnetic field for the +z-axis direction from an x-y plane component of a circularly-polarized magnetic field was detected. Strength of the radio frequency magnetic field was 300 Oe at maximum.

A first comparison example is now described. A radio frequency magnetic field, which was generated from a surface facing a STO of a magnetic pole (magnetic pole surface; pole plane) and a surface facing a magnetic recording head of a magnetic recording medium (ABS), was calculated with use of macro spin model.

Figure 8:
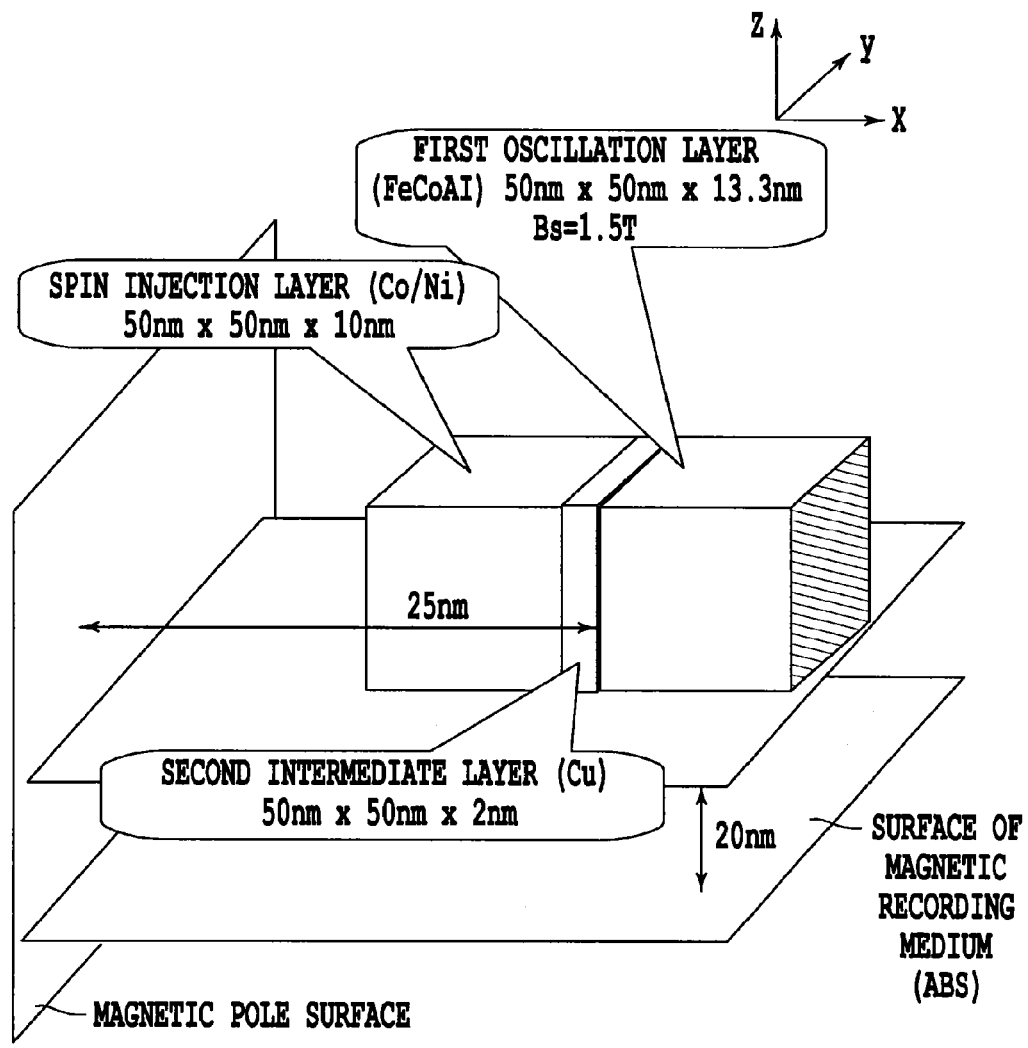
FIG. 8 is a view explaining a first comparison example.

FIG. 8 illustrates a structure used for calculating the radio frequency magnetic field from the comparative STO. FeCoAl was used for a first oscillation layer, and a volume of the first oscillation layer was set to 50 nm by 50 nm by 13.3 nm, and saturation flux density (Bs) was set to 1.5 T. Cu was used for a second intermediate layer, and a volume of the second intermediate layer was set to 50 nm by 50 nm by 2 nm. A Co/Ni artificial lattice film was used for a spin injection layer, and a volume of the spin injection layer was set to 50 nm by 50 nm by 10 nm. A distance between the first oscillation layer and the magnetic pole was set to 25 nm.

In this first comparative example the STO does not include a first intermediate layer and a second oscillation layer. This is the point of difference from the first working example.

FIGS. 9(A), 9(B), 9(C) show strength of the radio frequency magnetic field which was generated from the STO on the magnetic pole surface and on the ABS for this comparative example. A value (Oe) for the radio frequency magnetic field is shown on the line.

In FIG. 9(A), a vertical axis refers to a distance (nm) on a z-axis, and a horizontal axis refers to a distance (nm) on a y-axis. The vertical axis corresponds to a distance from the ABS. An area surrounded with a dotted line corresponds to a shape in viewing the STO from a laminating direction of the STO. A dotted line drawn in parallel to the horizontal axis refers to the ABS. Strength of the radio frequency magnetic field for an x-axis (down track direction: track direction of a magnetic recording medium) component was detected.

As shown in FIG. 9(A) strength of the radio frequency magnetic field was spread uniformly. Strength of the radio frequency magnetic field was 300 Oe at maximum. In the first working example, strength of the radio frequency magnetic field was 150 Oe at maximum. Thus, strength of the radio frequency magnetic field on the magnetic pole was one half of that of the first comparison example. Amplitude of magnetization fluctuation is in proportion to strength of the radio frequency magnetic field to be applied. Energy loss caused by magnetization fluctuation is in proportion to the square of amplitude of magnetization fluctuation. Thus, energy loss of magnetization fluctuation in the first working example was one quarter of energy loss of magnetization fluctuation in the comparative example.

In FIG. 9(B), a vertical axis refers to a distance (nm) on a z-axis, and a horizontal axis refers to a distance (nm) on a y-axis. The vertical axis corresponds to a distance from the ABS. An area surrounded with a dotted line corresponds to a shape in viewing from the STO from a laminating direction of the STO. A dotted line drawn in parallel to the horizontal axis refers to the ABS. Strength of the radio frequency magnetic field for a y-axis (cross track direction: direction which is across a track of the magnetic recording medium) component was detected. As shown in FIG. 9(B) strength of the radio frequency magnetic field was spread in the z-axis direction.

This is because the radio frequency magnetic field only for the y-axis was detected. Strength of the radio frequency magnetic field was 150 Oe at maximum. From these results, energy loss caused by magnetization fluctuation in the first working example is less than that of the first comparison example.

In FIG. 9(C), a vertical axis refers to a distance (nm) on the y-axis, and a horizontal axis refers to a distance (nm) on the x-axis. The x-axis and the y-axis correspond to a surface of the magnetic recording medium. An area surrounded with a dotted line corresponds to a shape in viewing a first oscillation layer (shown as FGL1 in FIG. 9(C)) from the magnetic recording medium. Strength of the radio frequency magnetic field for the +z-axis direction from a x-y plane component of a circularly-polarized magnetic field was detected. Strength of the radio frequency magnetic field was 300 Oe at maximum. Strength of the radio frequency magnetic field on the surface of the magnetic recording medium in the first working example was the same as that of the first comparative example.

From these results, using the STO in the first working example enables to reduce magnetization fluctuation for the magnetic pole with keeping the radio frequency magnetic field on the surface of the magnetic recording medium.

A second working example of the above-described embodiment is now explained. The radio frequency magnetic field when viewed from a STO, which is being applied to a magnetic pole, was calculated by use of macro spin model by changing a thickness of the second oscillation layer 100 and a distance between the first oscillation layer 60 and the second oscillation layer 100.

FIG. 10 illustrates a structure used for calculating the radio frequency magnetic field from the STO. FeCoAl was used for a first oscillation layer, a thickness of the first oscillation layer was set to 3.3 nm, and saturation flux density (Bs) of the first oscillation layer was set to 1.5 T. A distance between the first oscillation layer and the magnetic pole was set to 25 nm. FeCoAl was used for a second oscillation layer and saturation flux density (Bs) was set to 1.5 T.

Figure 11A:
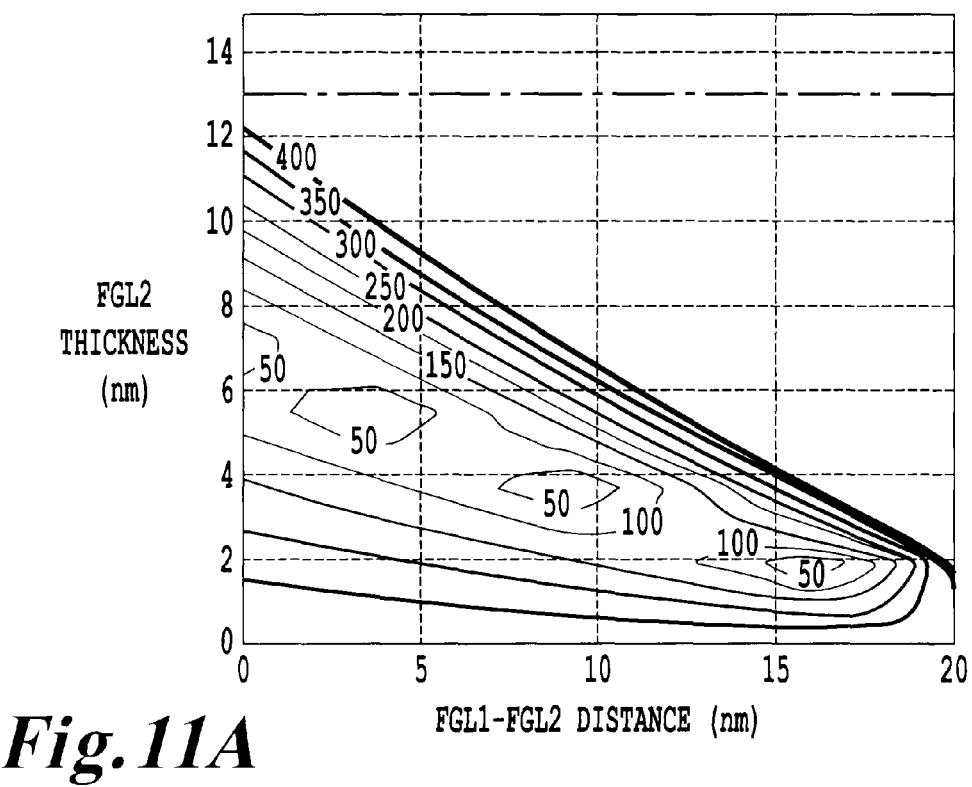
FIGS. 11(A), 11(B) are views explaining the second working example.
Figure 11B:
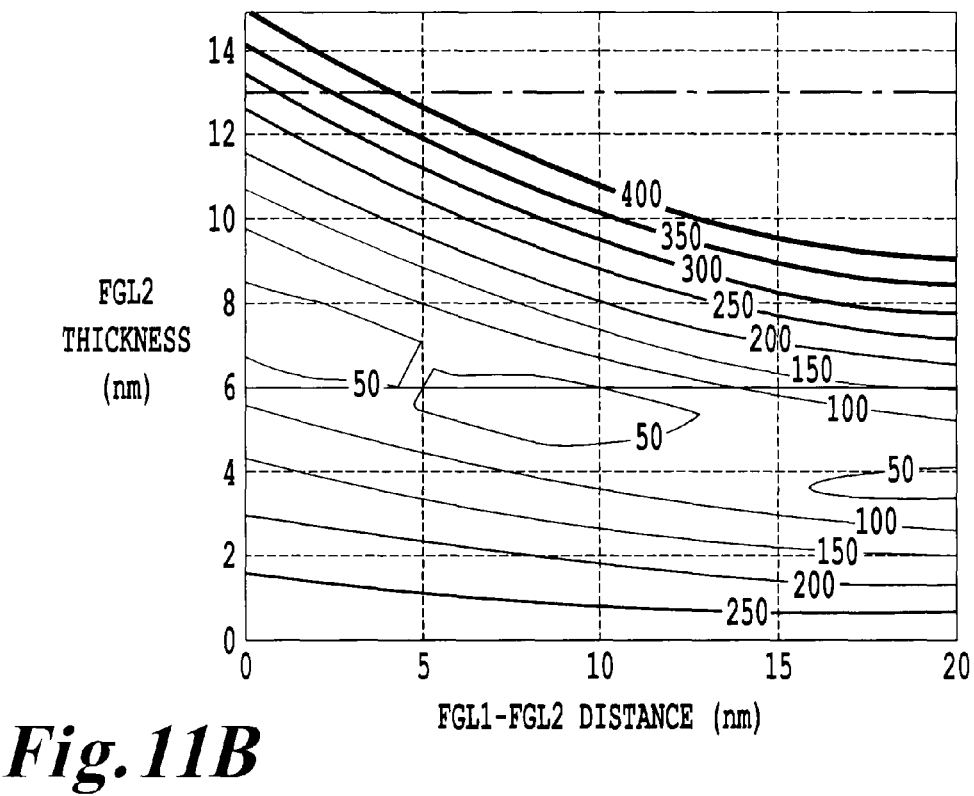

FIGS. 11(A), 11(B) show strength of radio the frequency magnetic field applied to the magnetic pole when viewed from the STO. Magnitude of the radio frequency magnetic field is shown on the line.

In FIGS. 11(A), 11(B), a vertical axis refers to a thickness of the second oscillation layer, and a horizontal axis refers to a distance between the first oscillation layer shown as FGL1 and the second oscillation layer shown as FGL2. A broken line which is depicted parallel to the horizontal axis refers to a thickness, at 13.3 nm, of the first oscillation layer. Strength of the radio frequency magnetic field for an x-axis component is shown in FIG. 11(A). Strength of the radio frequency magnetic field for a y-axis component is shown in FIG. 11(B).

For example, when the distance between the first oscillation layer and the second oscillation layer is 10 nm, the thickness of the second oscillation layer is notably set at a position that strength of the radio frequency magnetic field applied to the magnetic pole is the weakest. From FIG. 11(A) the longer the distance between the first oscillation layer and the second oscillation, the thinner the thickness of the second oscillation layer. The reason is that the radio frequency magnetic field generated from the second oscillation layer is applied to the magnetic pole efficiently because the magnetic pole is closer to the second oscillation layer than the first oscillation layer.

For example, a lateral area of the first oscillation layer can be smaller than a lateral area of the second oscillation layer when shapes of the first oscillation layer and the second oscillation layer are not rectangularly solid. In this case, a product of saturated magnetization of the first layer and the lateral area of the first oscillation layer is larger than that of saturated magnetization of the second oscillation layer and the lateral area of the second oscillation layer.

Figure 12:
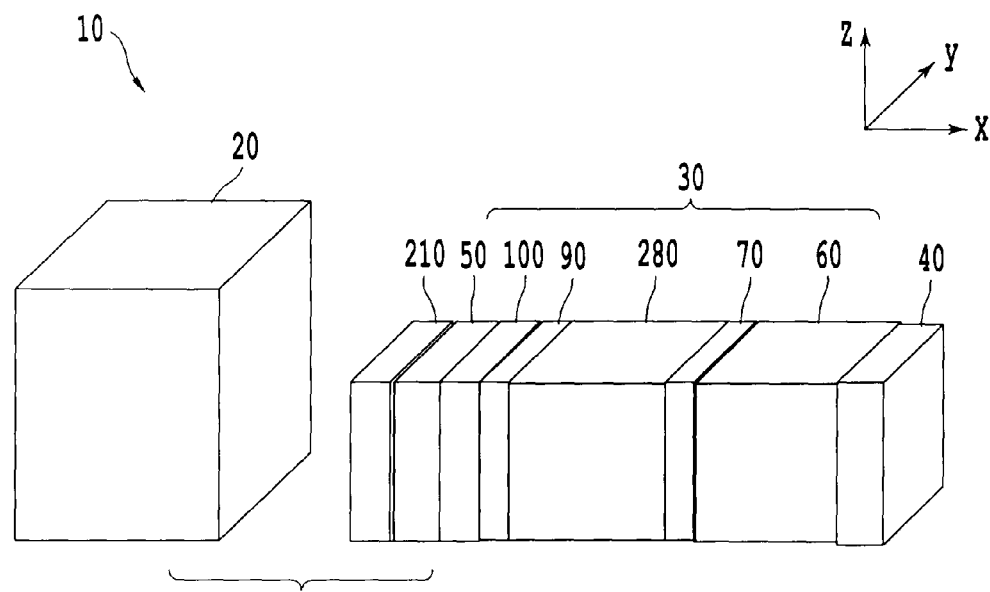
FIG. 12 is a view showing a modified example of the first embodiment.

As shown in FIG. 12, a third intermediate layer 210 can be provided between the electrode 50 and the magnetic pole 20. Exchange coupling between the magnetic pole 20 and the second oscillation layer 100 can be reduced by use of the third intermediate layer 210. This enables magnetization of the second oscillation layer 100 to be magnetized without depending on the magnetization direction of the magnetic pole 20 and to be magnetized easily to the magnetization direction of the first oscillation layer 60. As a result, magnetization of the second oscillation layer 210 and magnetization of the first oscillation layer 60 can be unparallel to each other more stably. The same materials for the second intermediate layer 70 or the first intermediate layer 90 can be used for the third intermediate layer 210. In this case, positions of the third intermediate layer 70 and the electrode 50 can be exchanged with each other. The third intermediate layer 210 can also work as an electrode.

Figure 13:
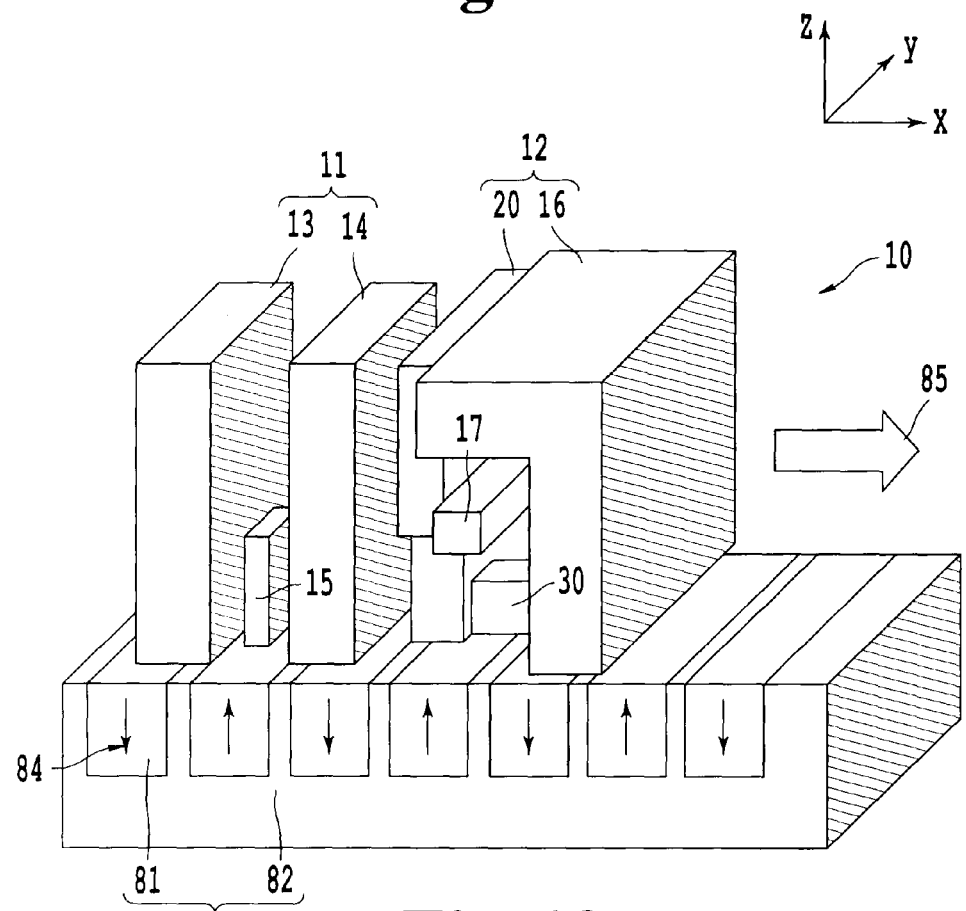
FIG. 13 is a whole view showing a recording head according to a second embodiment.

FIG. 13 shows a schematic illustration of a recording head 10 of a further second embodiment.

The recording head includes a reproducing head section 11 and a writing recoding section 12. The reproducing head section 11 includes a magnetic shield layer 14 and a magnetic reproducing device 15. The magnetic reproducing device 15 is provided between a magnetic shield layer 13 and the magnetic shield layer 14.

The writing head section 12 includes the magnetic pole 20, a shield 16 (return pass), an excitation coil 17, and a STO 30. Components of the reproducing head section 11 and the components of the writing head section 12 are separated by insulators such as alumina and $SiO_2$ (not shown). The magnetic pole 20 and the shield 16 are separated by insulators such as alumina and $SiO_2$, or high resistivity materials such as ferrite in neighboring part (back gap part) of an opposite side to the STO 30. This enables to efficiently pass a driving current through the STO 30 when a voltage is applied to the shield 16.

The STO 30 is provided between the magnetic pole 20 and the shield 16. That is, the shield 16 is provided on a side at which a first oscillation layer 60 is not provided on an electrode 40.

A GMR device or a TMR (tunnel magnetoresistive effect) device can be used for the magnetic reproducing device 15. To enhance reproducing resolution, the magnetic reproducing device 15 is provided between the magnetic shields 13 and 14.

A magnetic recording medium includes a medium substrate 82 and a magnetic recording layer 81 provided on the medium substrate 82. Magnetization 84 of the magnetic recording layer 81 is controlled to a prescribed direction by a magnetic field applied from the writing head section 12, and thereby writing is performed. The magnetization 84 of the magnetic recording layer 81 is read by the reproducing head section 11. An arrow 85 refers to a direction of the magnetic recording medium 80.

Figure 14:
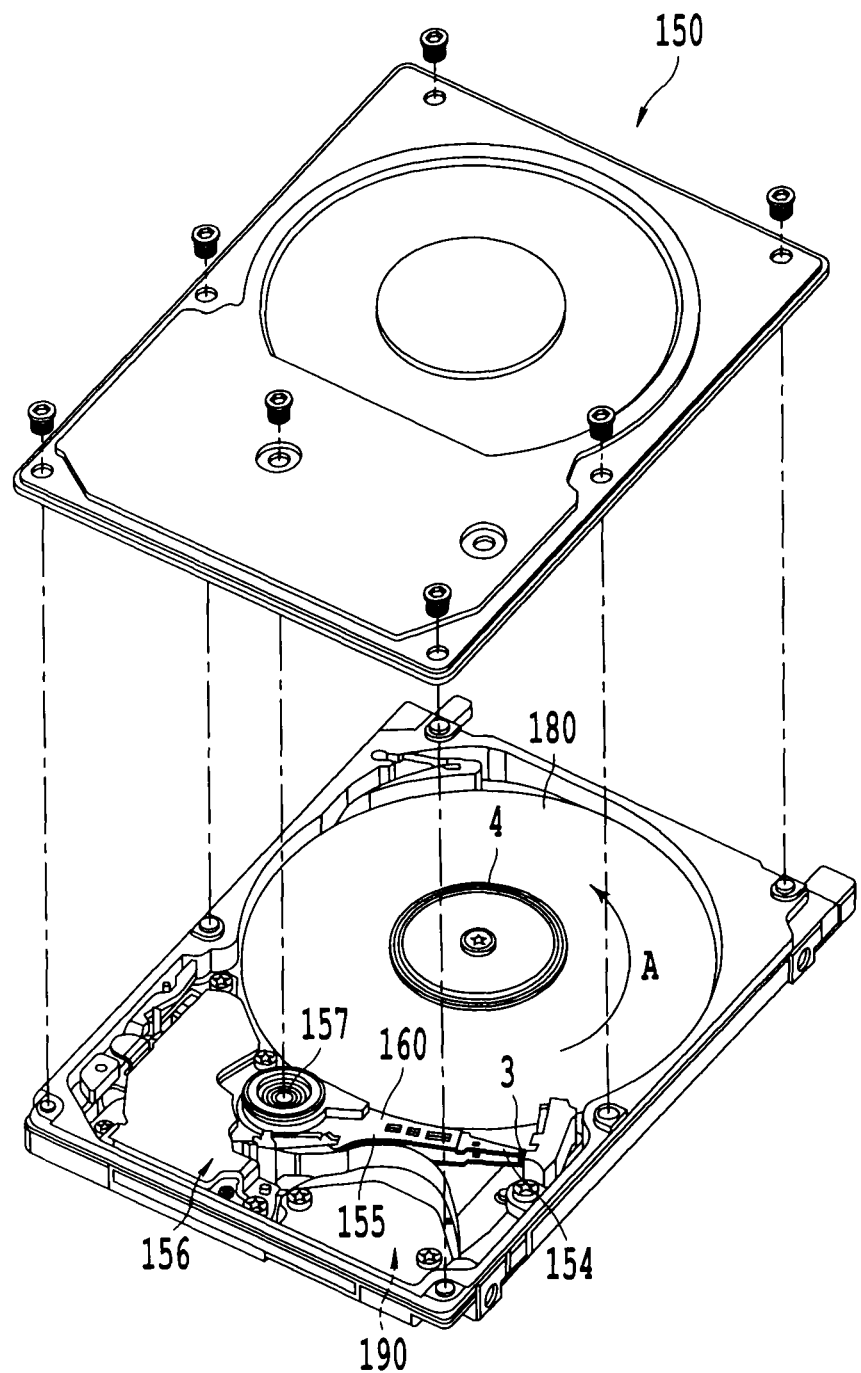
FIG. 14 is a view showing a magnetic recording apparatus according to a third embodiment.
Figure 15A:
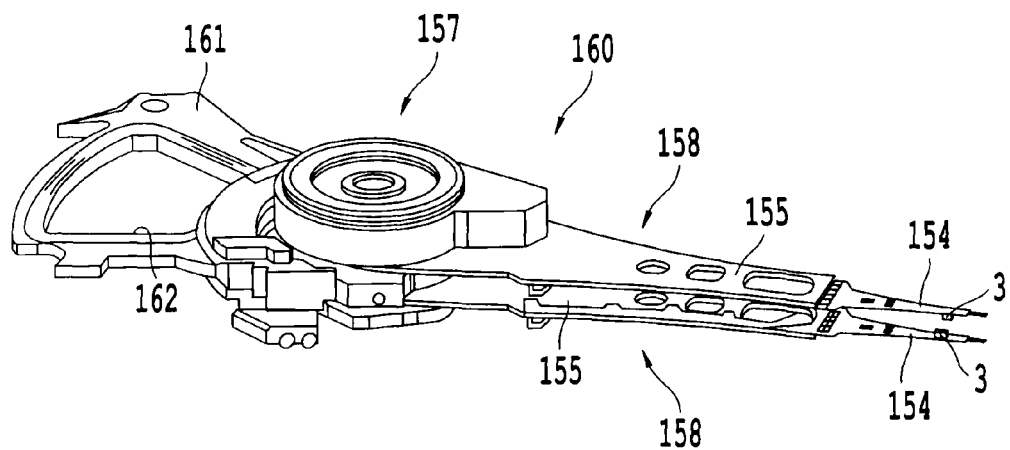
FIGS. 15(A), 15(B) are views showing a magnetic recording apparatus according to the third embodiment.
Figure 15B:
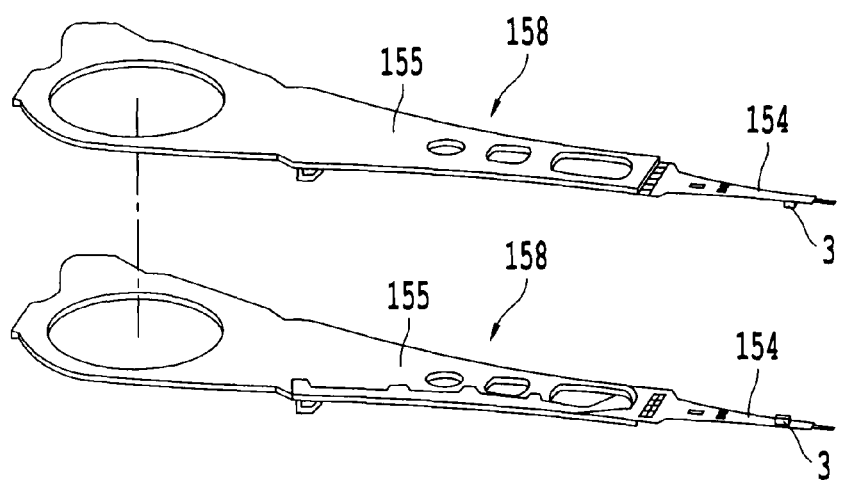

FIG. 14 illustrates a magnetic recording apparatus 150 according to a third embodiment. FIGS. 15(A), 15(B) illustrate a part of the magnetic recording apparatus 150 according to the third embodiment.

As shown in FIG. 14, the magnetic recording apparatus 150 is an apparatus based on a rotary actuator. In FIG. 14, a recording medium disk 180 is mounted on a spindle motor 4 and rotated in the direction of arrow A by a motor (not shown), in response to a control signal from a drive controller (not shown). The magnetic recording apparatus 150 can include a plurality of recording medium disks 180.

A head slider 3 for recording/reproducing information stored on the recording medium disk 180 includes a configuration as described above and is attached to the tip of a thin-film suspension 154. Here, on the head slider 3, for example, a magnetic recording head, which corresponds to the recording head 10 of FIG. 13, is installed near the tip of the head slider 3.

When the recording medium disk 180 is rotated, the pressing pressure by the suspension 154 is balanced with the pressure generated at the medium facing surface (an air bearing surface) of the head slider 3. Thus, the medium facing surface of the head slider 3 is held at a prescribed floating amount above the surface of the recording medium disk 180. Here, the head slider 3 can also be of the so-called "contact-traveling type", in which the head slider 3 is in contact with the recording medium disk 180.

The suspension 154 is connected to one end of an actuator arm 155 including a bobbin for holding a driving coil (not shown). A voice coil motor 156, which is a kind of linear motor, is provided on the other end of the actuator arm 155. The voice coil motor 156 can include the driving coil (not shown) wound up around the bobbin of the actuator arm 155, and a magnetic circuit including a permanent magnet and an opposed yoke opposed across this coil.

The actuator arm 155 is held by ball bearings (not shown) provided at two positions, top and bottom, of a bearing portion 157, so that the actuator arm 155 can be slidably rotated by the voice coil motor 156. Consequently, the magnetic recording head can be moved to an arbitrary position on the recording medium disk 180.

FIG. 15(A) illustrates the configuration of part of the magnetic recording apparatus, and is an enlarged perspective view of a head stack assembly.

FIG. 15(B) is a perspective view illustrating a magnetic head assembly (head gimbal assembly) 158, which constitutes part of the head stack assembly 160.

As shown in FIG. 15(A), the head stack assembly 160 includes a bearing portion 157, a head gimbal assembly 158 extending from this bearing portion 157, and a support frame 161 extending from the bearing portion 157 to the direction opposite from the head gimbal assembly 158 and supporting the coil 162 of the voice coil motor.

As shown in FIG. 15(B), the head gimbal assembly 158 includes an actuator arm 155 extending from the bearing portion 157, and a suspension 154 extending from the actuator arm 155.

A head slider 3 including the magnetic recording head is attached to the tip of the suspension 154. On the head slider 3, the magnetic recording head is installed.

Thus, the magnetic head assembly (head gimbal assembly) 158 includes the magnetic recording head, a head slider 3 with the magnetic recording head installed thereon, a suspension 154 with the head slider 3 installed on one end, and an actuator arm 155 connected to the other end of the suspension 154.

The suspension 154 includes lead wires (not shown) for writing and reading signals, for a heater for adjusting the floating amount, and for the spin torque oscillator. These lead wires are electrically connected to respective electrodes of the magnetic recording head incorporated in the head slider 3. Furthermore, electrode pads (not shown) are provided on the head gimbal assembly 158. In this example, eight electrode pads are provided. More specifically, two electrode pads are used for the coil of the magnetic pole 20, two electrode pads are used for the magnetic reproducing device 71, two electrode pads are used for DFH (dynamic flying height), and two electrode pads are used for the STO 30.

Furthermore, a signal processing unit 190 (FIG. 14) is provided to write and read signals on the magnetic recording medium using the magnetic recording head. For instance, the signal processing unit 190 is provided on the rear surface side, as viewed in FIG. 14 of the magnetic recording apparatus 150. The input/output lines of the signal processing unit 190 are connected to the electrode pads of the head gimbal assembly 158 and electrically coupled to the magnetic recording head.

Thus, the magnetic recording apparatus 150 includes a magnetic recording medium, the magnetic recording head according to the above embodiments, a movable unit capable of relatively moving the magnetic recording medium and the magnetic recording head opposing each other in a spaced or contact state, a position control unit for positioning the magnetic recording head at a prescribed recording position on the magnetic recording medium, and a signal processing unit for writing and reading signals on the magnetic recording medium using the magnetic recording head.

Specifically, the above magnetic recording medium can be a recording medium disk 180.

The above movable unit can include a head slider 3.

The above signal processing unit can include a head gimbal assembly 158.

The magnetic recording apparatus 150 includes a magnetic recording medium, the magnetic head assembly, and a signal processing unit for writing and reading signals on the magnetic recording medium using the magnetic recording head installed on the magnetic head assembly.

The magnetic recording apparatus 150 enables to realize radio frequency magnetic field assisted recording with high recording density by use of the above magnetic recording head.

In the magnetic recording apparatus, the STO 30 can be provided on the trailing side of the magnetic pole 20. In this case, the magnetic recording layer 81 of the magnetic recording medium 80 first opposes the STO 30 and subsequently opposes the magnetic pole 20.

Alternatively, in the magnetic recording apparatus, the STO 30 can be provided on the leading side of the magnetic pole 20. In this case, the magnetic recording layer 81 of the magnetic recording medium 80 first opposes the magnetic pole 20 and subsequently opposes the STO 30.

In the following, a magnetic recording medium that can be used in the magnetic recording apparatus is described.

Figure 16A:
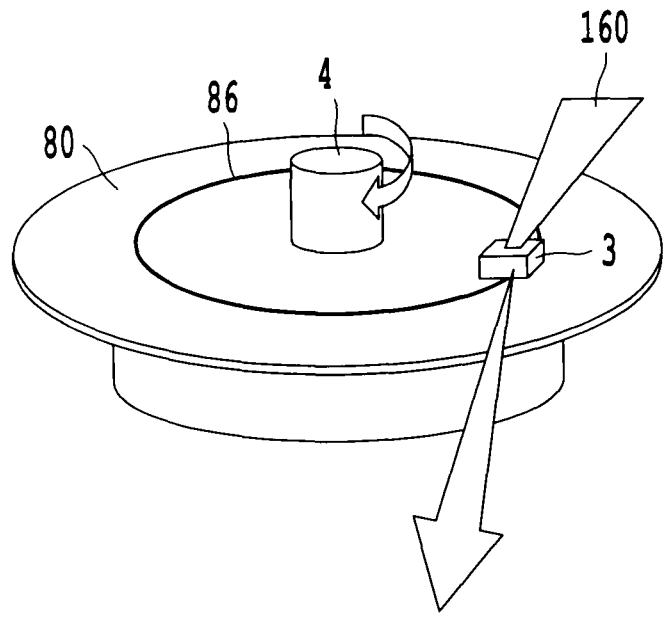
FIGS. 16(A), 16(B) are views showing a magnetic recording apparatus according to the third embodiment.
Figure 16B:
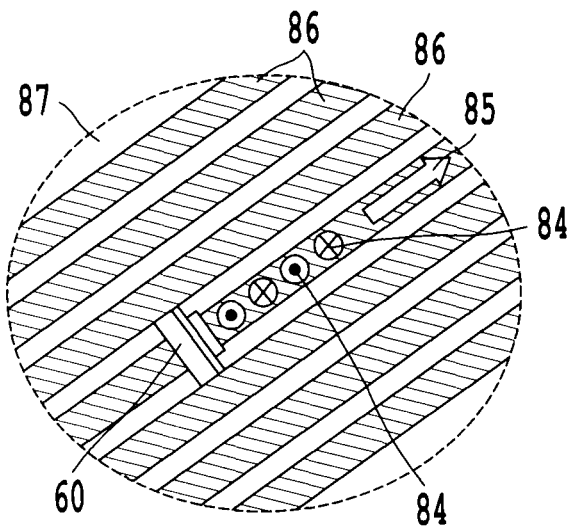

FIGS. 16(A), 16(B) are schematic perspective views illustrating the configuration of a magnetic recording medium of the magnetic recording apparatus.

As shown in FIGS. 16(A), 16(B), the magnetic recording medium 80 used in the magnetic recording apparatus includes perpendicularly oriented, multiparticle magnetic discrete tracks (recording tracks) 86 separated from each other by a nonmagnetic material (or air) 87. When this magnetic recording medium 80 is rotated by a spindle motor 4 and moved toward the medium travel direction 85, a magnetization 84 can be produced by the magnetic recording head.

Thus, in the magnetic recording apparatus, the magnetic recording medium 80 can be a discrete track medium in which adjacent recording tracks are formed via a nonmagnetic member.

By setting the width (TS) of the STO 30 in the width direction of the recording track to not less than the width (TW) of the recording track 86 and not more than the recording track pitch (TP), it is possible to significantly suppress the decrease of coercivity in adjacent recording tracks due to a leakage radio frequency magnetic field generated from the STO 30. Hence, in the magnetic recording medium 80 of this example, only the target recording track 86 can be effectively subjected to radio frequency magnetic field assisted recording.

According to this example, a radio frequency assisted recording apparatus with narrow tracks, i.e., high track density, is realized more easily than in the case of using a multi-particle perpendicular medium made of a so-called "blanket film". Furthermore, by using radio frequency magnetic field assisted recording in conjunction with a magnetic medium material having high magnetic anisotropy energy (Ku) such as FePt and SmCo, which does not allow writing by conventional magnetic recording heads, magnetic medium particles can be further downscaled to the size of nanometers. Thus, it is possible to realize a magnetic recording apparatus having far higher linear recording density than conventional also in the recording track direction (bit direction).

In the magnetic recording apparatus, recording can be reliably performed also on the magnetic recording layer having high coercivity in a discrete-type magnetic recording medium 80, enabling magnetic recording with high density and high speed.

Figure 17A:
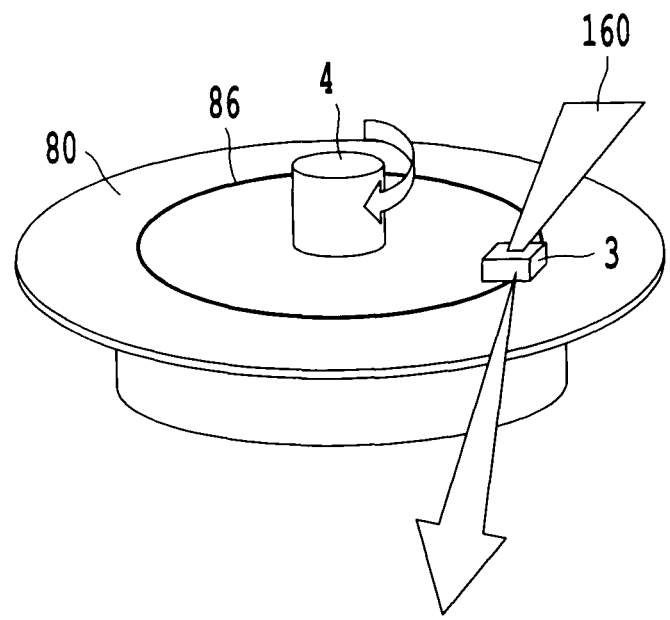
FIGS. 17(A), 17(B) are views showing a magnetic recording apparatus according to the third embodiment.
Figure 17B:
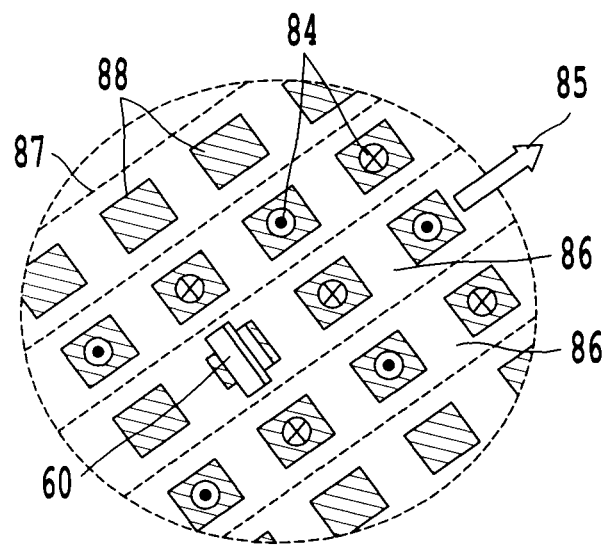

FIGS. 17(A), 17(B) are schematic perspective views illustrating the configuration of another magnetic recording medium of the magnetic recording apparatus.

As shown in FIGS. 17(A), 17(B), the another magnetic recording medium 80 that can be used in the magnetic recording apparatus includes magnetic discrete bits 88 separated from each other by a nonmagnetic material 87. When this magnetic recording medium 80 is rotated by a spindle motor 4 and moved toward the medium travel direction 85, a magnetization 84 can be produced by the magnetic recording head.

Thus, in the magnetic recording apparatus, the magnetic recording medium 80 can be a discrete bit medium in which isolated recording magnetic dots are regularly arranged via a nonmagnetic member.

In the magnetic recording apparatus, recording can be reliably performed also on the magnetic recording layer having high coercivity in a discrete-type magnetic recording medium 80, enabling magnetic recording with high density and high speed.

Also in this example, by setting the width (TS) of the STO 30 in the width direction of the recording track to be not less than the width (TW) of the recording track 86 and not more than the recording track pitch (TP), it is possible to significantly suppress the decrease of coercivity in adjacent recording tracks due to a leakage radio frequency magnetic field generated from the STO 30. Hence, only the target recording track 86 can be effectively subjected to radio frequency magnetic field assisted recording. According to this example, by downscaling the magnetic discrete bit 88 and increasing its magnetic anisotropy energy (Ku), there is a possibility of realizing a radio frequency magnetic field assisted recording apparatus having a recording density of 10 Tbits/inch$^2$ or more as long as thermal fluctuation resistance under the operating environment can be maintained.

While certain embodiments of the invention have been described, these embodiments have been presented by way of example only, and are not intended to limit the scope of the embodiments of the inventions. Indeed, the novel elements and apparatuses described herein may be embodied in a variety of other forms; furthermore, various omissions, substitutions, and changes in the form of the methods and systems described herein may be made without departing from the spirit of the embodiments of the invention. The accompanying claims and their equivalents are intended to cover such forms or modifications as would fall within the scope and spirit of the embodiments of the invention.

What is claimed is:

1. A recording head comprising:
   a first electrode;
   a second electrode;
   a first magnetic layer provided between the first electrode and the second electrode;
   a second magnetic layer provided between the first magnetic layer and the second electrode;
   a first intermediate layer provided between the second magnetic layer and the second electrode;
   a third magnetic layer provided between the first intermediate layer and the second electrode, wherein a product of saturated magnetization of the first magnetic layer and a lateral area of the first magnetic layer is larger than a product of saturated magnetization of the third magnetic layer and a lateral area of the third magnetic layer; and
   a magnetic pole provided on a side of the second electrode opposite to a side where the third magnetic layer is provided.

2. The recording head of claim 1, further comprising a shield provided on a side opposite to a side where the first magnetic layer is provided in the first electrode.

3. The recording head of claim 1, wherein the second magnetic layer includes an easy axis of magnetization in parallel to a laminating direction of the second magnetic layer.

4. The recording head of claim 1, wherein coercivity of the first magnetic layer is smaller than a magnetic field applied from the magnetic pole, coercivity of the second magnetic layer is smaller than the magnetic field, coercivity of the third magnetic layer is smaller than the magnetic field, and the coercivity of the second magnetic layer is larger than the coercivity of the first or third magnetic layer.

5. The recording head of claim 1, further comprising a second intermediate layer provided between the first magnetic layer and the second magnetic layer.

6. The recording head of claim 1, further comprising a third intermediate layer provided between the second electrode and the magnetic pole or between the second electrode and the third magnetic layer.

7. The recording head of claim 1, wherein the first intermediate layer comprises at least one of elements selected from Ru, Pt, Pd, and Ta.

8. The recording head of claim 1, wherein the second intermediate layer comprises at least one of elements selected from Cu, Ag, and Au.

9. The recording head of claim 1, wherein the first magnetic layer and the third magnetic layer comprises at least one of Fe or Co.

10. The recording head of claim 9, wherein the first magnetic layer and the third magnetic layer comprises crystalline orientation in fcc <111> direction or bcc <110> direction in a laminating direction of the first magnetic layer and the third magnetic layer.

11. The recording head of claim 1, wherein the second magnetic layer comprises a Fe or Co related alloy comprising one or a plural set of elements selected from Ni, Pt, Pd, Tb, and Sm.

12. The recording head of claim 11, wherein the second magnetic layer comprises crystalline orientation in fcc <111> direction or hcp <0001> direction in a laminating direction of the second magnetic layer.

13. A magnetic head assembly, comprising:
    a head slider;

a magnetic recording head being installed on the head slider, the magnetic recording head comprising:
a first electrode;
a second electrode;
a first magnetic layer provided between the first electrode and the second electrode;
a second magnetic layer provided between the first magnetic layer and the second electrode;
a first intermediate layer provided between the second magnetic layer and the second electrode;
a third magnetic layer provided between the first intermediate layer and the second electrode, wherein a product of saturated magnetization of the first magnetic layer and a lateral area of the first magnetic layer is larger than a product of saturated magnetization of the third magnetic layer and a lateral area of the third magnetic layer;
a magnetic pole provided on a side of the second electrode opposite to a side where the third magnetic layer is provided; and
an actuator arm connected to an end of the head slider.

14. A magnetic recording apparatus, comprising:
a magnetic recording medium;
a magnetic head assembly comprising:
a head slider;
a magnetic recording head being installed on the head slider, the magnetic recording head comprising:
a first electrode;
a second electrode;
a first magnetic layer provided between the first electrode and the second electrode;
a second magnetic layer provided between the first magnetic layer and the second electrode;
a first intermediate layer provided between the second magnetic layer and the second electrode;
a third magnetic layer provided between the first intermediate layer and the second electrode, wherein a product of saturated magnetization of the first magnetic layer and a lateral area of the first magnetic layer is larger than a product of saturated magnetization of the third magnetic layer and a lateral area of the third magnetic layer;
a magnetic pole provided on a side of the second electrode opposite to a side where the third magnetic layer is provided; and
an actuator arm connected to an end of the head slider; and
a signal processing unit configured to write and read a signal on the magnetic recording medium using the magnetic recording head installed on the magnetic head assembly.

15. The apparatus of claim 14, wherein the magnetic recording medium is a discrete track medium, and adjacent recording tracks are formed via a nonmagnetic portion in the discrete track medium.

16. The apparatus of claim 15, wherein the magnetic recording medium is a discrete bit medium, and isolated recording magnetic dots are regularly arranged via a nonmagnetic portion in the discrete bit medium.

* * * * *